United States Patent
Koito et al.

(10) Patent No.: US 10,534,208 B2
(45) Date of Patent: Jan. 14, 2020

(54) DISPLAY DEVICE COMPRISING A SEPARATOR HAVING A PLURALITY OF FIRST AND SECOND ELECTRODES RESPECTIVELY FORMING FIRST AND SECOND UNIT SEPARATORS AT DIFFERENT PITCHES FROM EACH OTHER

(71) Applicant: Japan Display Inc., Tokyo (JP)

(72) Inventors: Takeo Koito, Tokyo (JP); Yingbao Yang, Tokyo (JP); Daichi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 304 days.

(21) Appl. No.: 15/443,337

(22) Filed: Feb. 27, 2017

(65) Prior Publication Data
US 2017/0248829 A1    Aug. 31, 2017

(30) Foreign Application Priority Data

Feb. 29, 2016    (JP) .................................. 2016-037877
Feb. 21, 2017    (JP) .................................. 2017-030351

(51) Int. Cl.
*G02F 1/13*    (2006.01)
*G02F 1/29*    (2006.01)
*G02B 27/22*    (2018.01)

(52) U.S. Cl.
CPC ......... *G02F 1/1323* (2013.01); *G02B 27/225* (2013.01); *G02B 27/2207* (2013.01); *G02B 27/2214* (2013.01); *G02F 1/29* (2013.01)

(58) Field of Classification Search
CPC .. G02B 27/225; G02B 27/2207; G02F 1/1323
See application file for complete search history.

(56) References Cited

U.S. PATENT DOCUMENTS

| | | | |
|---|---|---|---|
| 2007/0183015 A1* | 8/2007 | Jacobs ................. | G02F 1/1323 359/245 |
| 2009/0002267 A1* | 1/2009 | Nam ................... | G02B 27/2214 345/6 |
| 2009/0051835 A1* | 2/2009 | Park ................... | G02F 1/133512 349/15 |
| 2011/0051239 A1 | 3/2011 | Daiku | |
| 2013/0057539 A1* | 3/2013 | Kim .................. | G02F 1/134309 345/419 |

(Continued)

FOREIGN PATENT DOCUMENTS

| | | | | |
|---|---|---|---|---|
| EP | 1816510 A1 * | 8/2007 | ........... | G02F 1/1323 |
| JP | 2005-092103 | 4/2005 | | |

(Continued)

*Primary Examiner* — Paul C Lee
(74) *Attorney, Agent, or Firm* — K&L Gates LLP

(57) ABSTRACT

A display device according to one aspect of the present invention includes: a display unit that displays an image including a plurality of viewpoint images; and a separator that includes a plurality of first electrodes that form, at a first pitch, a plurality of first unit separators that separate the plurality of viewpoint images, a plurality of second electrodes that form a plurality of second unit separators at a second pitch which is different from the first pitch, and a liquid crystal layer. The plurality of first electrodes and the plurality of second electrodes are opposed to each other with the liquid crystal layer interposed therebetween.

12 Claims, 21 Drawing Sheets

(56) References Cited

U.S. PATENT DOCUMENTS

2013/0107146 A1\* 5/2013 Kim ..................... G02F 1/1347
349/15
2016/0274373 A1 9/2016 Suzuki et al.

FOREIGN PATENT DOCUMENTS

| JP | 2011-53277 | | 3/2011 | | |
|---|---|---|---|---|---|
| JP | 2012220806 | A \* | 11/2012 | ............... | G09G 3/30 |
| JP | 2012226036 | A \* | 11/2012 | ......... | G02B 27/2214 |
| JP | 2012233990 | A \* | 11/2012 | ............... | G09G 3/30 |
| JP | 2012-242443 | | 12/2012 | | |
| JP | 2012-249248 | | 12/2012 | | |
| JP | 2016109968 | A \* | 6/2016 | ....... | G02F 1/134309 |
| JP | 2016-177058 | | 10/2016 | | |

\* cited by examiner

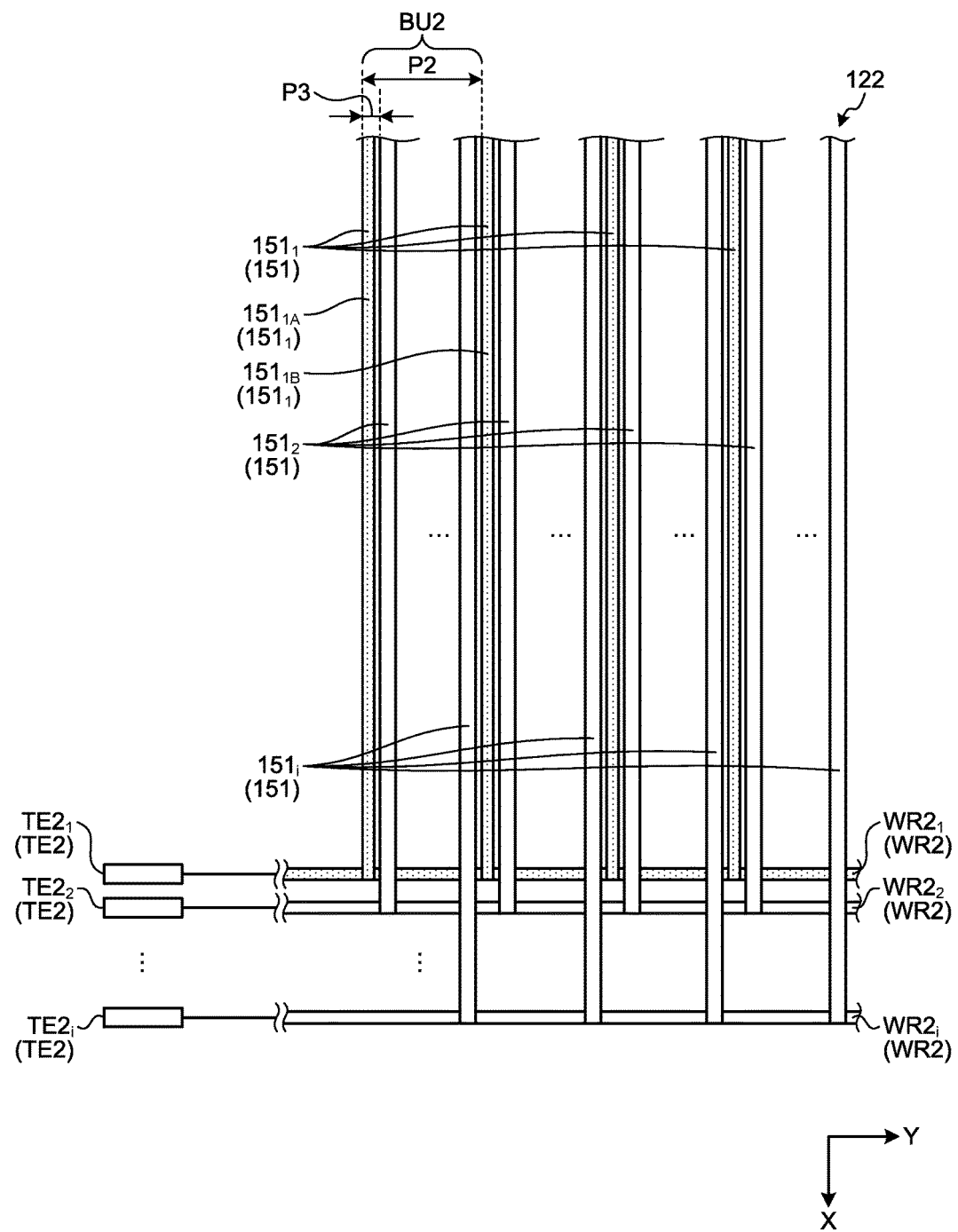

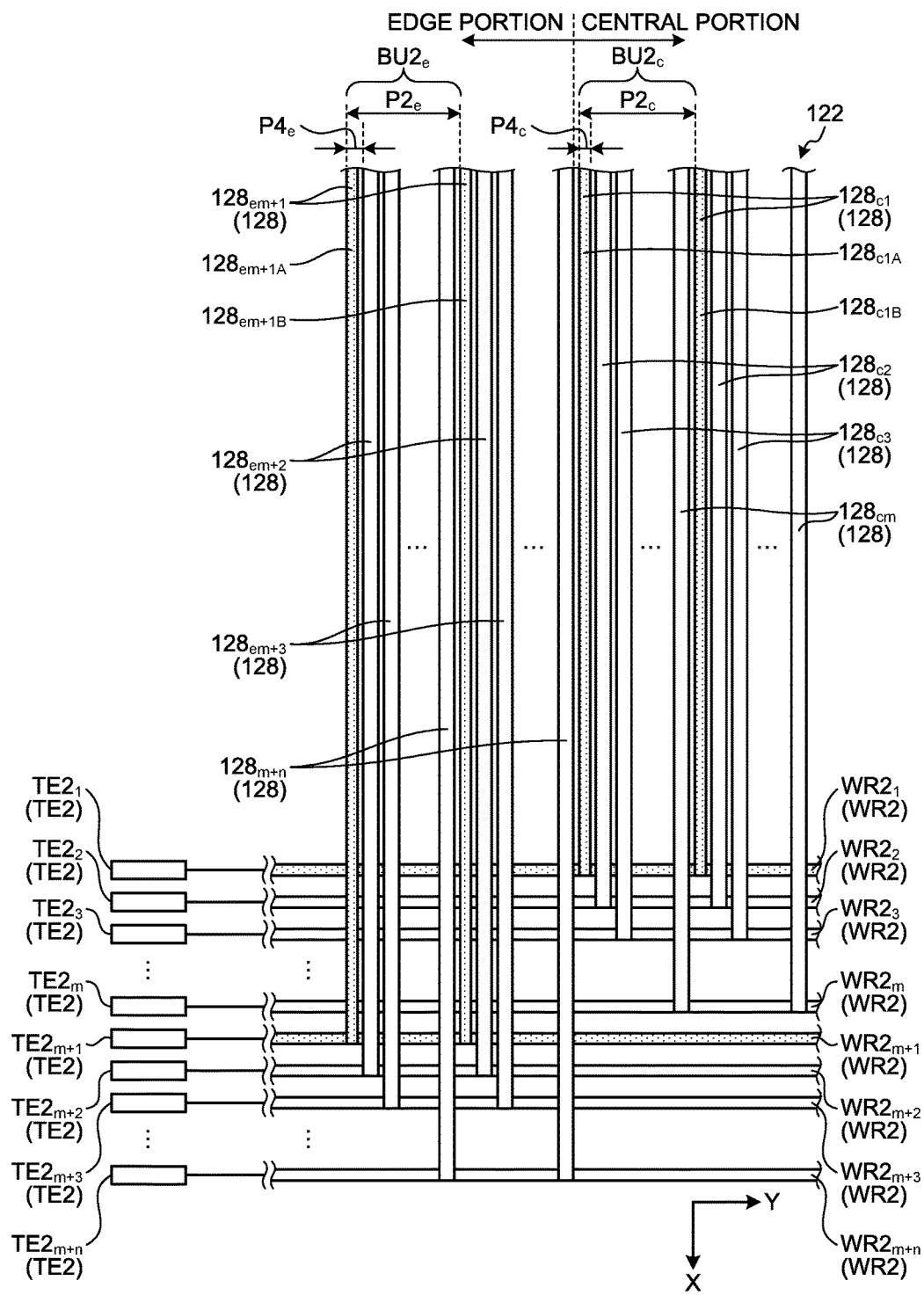

DISPLAY DEVICE COMPRISING A SEPARATOR HAVING A PLURALITY OF FIRST AND SECOND ELECTRODES RESPECTIVELY FORMING FIRST AND SECOND UNIT SEPARATORS AT DIFFERENT PITCHES FROM EACH OTHER

CROSS-REFERENCE TO RELATED APPLICATIONS

This application claims priority from Japanese Application No. 2016-037877, filed on Feb. 29, 2016, and Japanese Application No. 2017-030351, filed on Feb. 21, 2017, the contents of which are incorporated by reference herein in its entirety.

BACKGROUND

1. Technical Field

The present disclosure relates to a display device.

2. Description of the Related Art

Display devices to display a stereoscopic image or a multi-viewpoint image using an image separator are known. An image separator is formed by a plurality of unit separators aligned in one direction. A unit separator corresponds to, for example, one barrier in a parallax barrier or one lens in a lenticular lens. In a display device of this type, when a relative position of the image separator to an observer is shifted, a stereoscopic image or a multi-viewpoint image is not correctly displayed. Therefore, Japanese Patent Application Laid-open Publication No. 2011-53277 and Japanese Patent Application Laid-open Publication No. 2005-92103 propose to vary the width of or a pitch of a unit separator based on a position of an observer and thereby extend an area (vision area) where a stereoscopic image or a multi-viewpoint image is appropriately observed.

An image separator is formed by a liquid crystal panel, for example. A liquid crystal panel includes a pair of substrates and a liquid crystal layer interposed therebetween. One of the substrates is provided with a plurality of band-shaped individual electrodes aligned in one direction while the other substrate is provided with a common electrode. Applying a separator-generating electric potential to adjacent one or more individual electrodes results in formation of one unit separator. When a position of an observer slightly changes, it is desirable that a pitch of the unit separator also slightly changes. In order to slightly change the pitch of the unit separator, it is desirable that the width of the individual electrodes is narrow. For example, when an amount of change of the pitch of the unit separator is denoted as Δp, the width of the individual electrode is desirably at least Δp or less. However, it is not easy to reduce the width of the individual electrode due to limitation of patterning accuracy.

SUMMARY

A display device according to one aspect of the present invention includes: a display unit that displays an image including a plurality of viewpoint images; and a separator that includes a plurality of first electrodes that form, at a first pitch, a plurality of first unit separators that separate the plurality of viewpoint images, a plurality of second electrodes that form a plurality of second unit separators at a second pitch which is different from the first pitch, and a liquid crystal layer. The plurality of first electrodes and the plurality of second electrodes are opposed to each other with the liquid crystal layer interposed therebetween.

A display device according to second aspect of the present invention includes: a first substrate, a second substrate opposed to the first substrate, a third substrate opposed to the second substrate, a plurality of pixels on the third substrate, a plurality of first electrodes on the first substrate, and a plurality of second electrodes on the second substrate. The plurality of the first electrodes are present at a third pitch, and the plurality of the second electrodes are present at a forth pitch which is different from the third pitch.

A separator according to one aspect of the present invention includes: a first substrate, a second substrate, a plurality of first electrodes on the first substrate, and a plurality of second electrodes on the second substrate. The plurality of the first electrodes are present at a third pitch, and the plurality of the second electrodes are present at a forth pitch which is different from the third pitch.

BRIEF DESCRIPTION OF THE DRAWINGS

FIG. 14 is a plan view illustrating a configuration of a second substrate of the separator;

FIG. 16 is a plan view illustrating a configuration of a second substrate of the separator;

DETAILED DESCRIPTION

Figure 1:
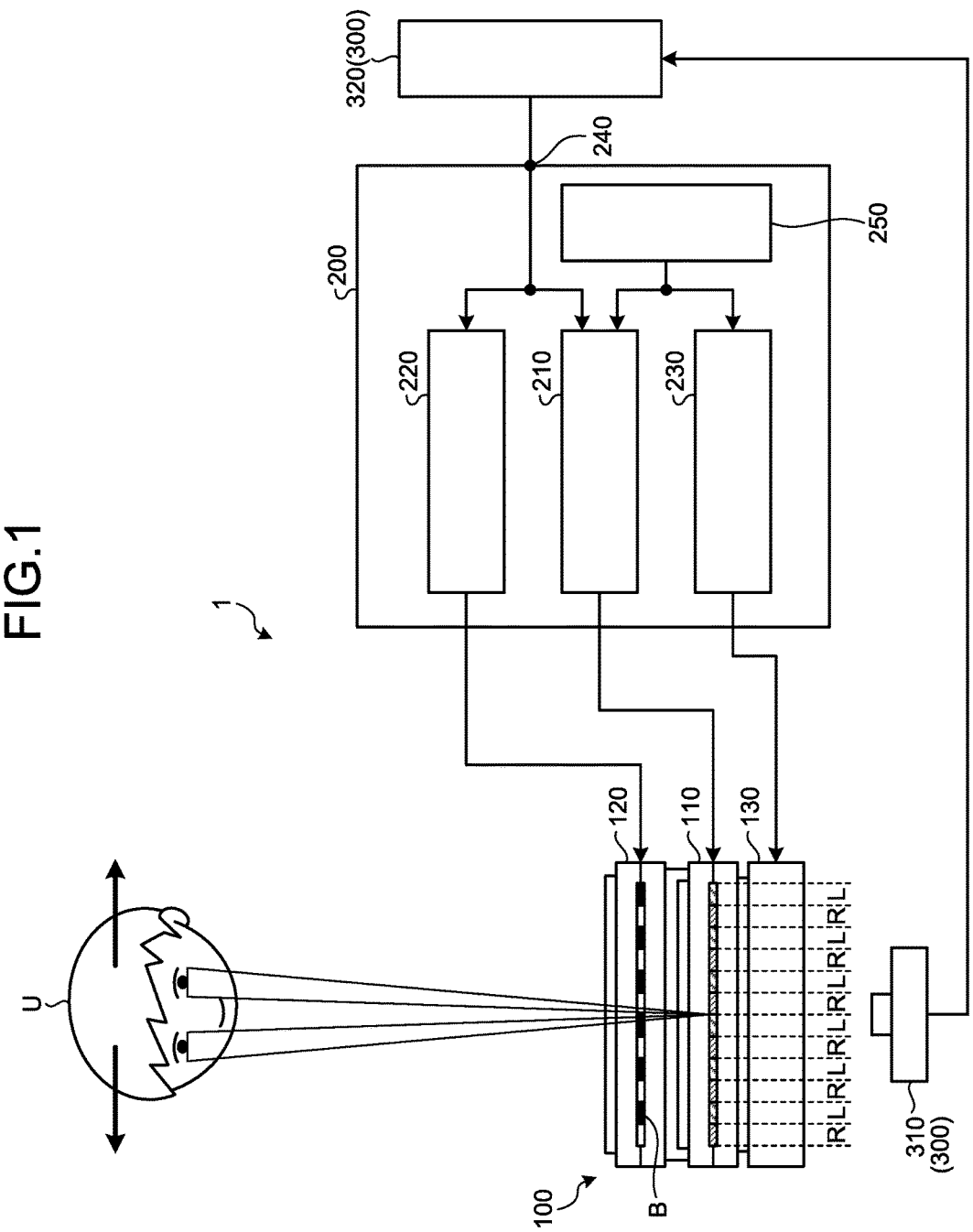
FIG. 1 is a schematic diagram illustrating a display device according to a first embodiment.

Embodiments for implementing the invention will be described in details with reference to the drawings. The present invention is not limited to contents described in the embodiments below. Components described below include those that can be easily conceived of by a person skilled in the art and those that are substantially the same. The components described below can be combined as appropriate. It should be noted that the disclosure is merely an example. Appropriate modifications that can be easily conceived of by a person skilled in the art without departing from the principles of the invention are naturally included in the scope of the present invention. The width, the thickness, the shape, or the like of each unit in the drawings may be represented schematically as compared to an actual embodiment for the sake of further clarity of descriptions; however, these are merely examples and thus do not limit interpretation of the present invention. Herein and in the drawings, a similar component to that described in a previous drawing may be denoted with the same symbol and detailed descriptions may be omitted as appropriate.

First Embodiment

FIG. 1 is a schematic diagram illustrating a display device 1 according to a first embodiment.

The display device 1 includes an image forming unit 100, a controller 200, and a detector 300.

The image forming unit 100 includes, for example, a display unit 110, a separator 120, and a illuminator 130. The image forming unit 100 modulates, in the display unit 110, illumination light emitted from the illuminator 130 and thereby forms an image. An observer U observes, via the separator 120, the image displayed by the display unit 110. The image forming unit 100 has a first mode where a plurality of viewpoint images are displayed and a second mode where a single image not including a plurality of viewpoint images is displayed. When display is carried out in the first mode, an image separator B is formed in the separator 120 and an image including the plurality of viewpoint images (for example a right-eye viewpoint image R and a left-eye viewpoint image L) is displayed in the display unit 110. When display is carried out in the second mode, the image separator B is not formed in the separator 120 and a single image is displayed in the display unit 110. Details of the image forming unit 100 will be described later.

The controller 200 includes a display controller 210, a separator controller 220, a lighting controller 230, and a luminance adjustor 250. The display controller 210 controls the display unit 110 and displays an image for the first mode or an image for the second mode in the display unit 110. The separator controller 220 controls the separator 120 and forms the image separator B in the separator 120 in the first mode. The separator controller 220 controls a position where the image separator B is formed and timing when the image separator B is formed. The lighting controller 230 controls the illuminator 130 and emits illumination light from the illuminator 130 toward the display unit 110. The lighting controller 230 controls timing when illumination light is emitted.

The detector 300 detects positional information related to a position of the observer U and supplies the positional information to a positional information acquisitor 240. Examples of the positional information acquisitor 240 include, but are not limited to, a connector electrically connected to the controller 200. The detector 300 includes an imager 310 that images the observer U and an image analyser 320 that analyzes an image of the observer U imaged by the imager 310 and detects the positional information. The positional information acquisitor 240 acquires, from the image analyser 320, the positional information of the observer U observing an image.

The controller 200 controls the display unit 110 and the separator 120 based on the positional information of the observer U. When display is carried out in the first mode, the separator 120 changes a position of the image separator B based on the positional information. The display unit 110 displays an image including a plurality of viewpoint images. When display is carried out in the second mode, the separator 120 does not form the image separator B and the display unit 110 displays a single image not including the plurality of viewpoint images.

The image separator B is not formed in the second mode and thus brightness of the image (e.g. luminance value) changes upon switching between the first mode and the second mode. Therefore in order to suppress the change of brightness, the controller 200 may control at least one of the display unit 110 and the illuminator 130 at a timing when the first mode and the second mode are switched and thereby homogenize brightness of the image.

For example, the controller 200 includes the luminance adjustor 250. The luminance adjustor 250 receives a switching signal for switching between the first mode and the second mode and transmits, to the lighting controller 230, at least one of a processing signal for raising luminance when display is carried out in the first mode and a processing signal for reducing luminance when display is carried out in the second mode. This results in adjustment of a luminance value of the illuminator 130, thereby suppressing the change of brightness of the image upon switching between the first mode and the second mode.

The luminance adjustor 250 receives the switching signal and may transmit, to the display controller 210, at least one of a processing signal for raising a gradation value when display is carried out in the first mode and a processing signal for reducing the gradation value when display is carried out in the second mode. In this case, a gradation value of the display unit 110 is adjusted, thereby suppressing the change of brightness of the image upon switching between the first mode and the second mode.

Figure 2:
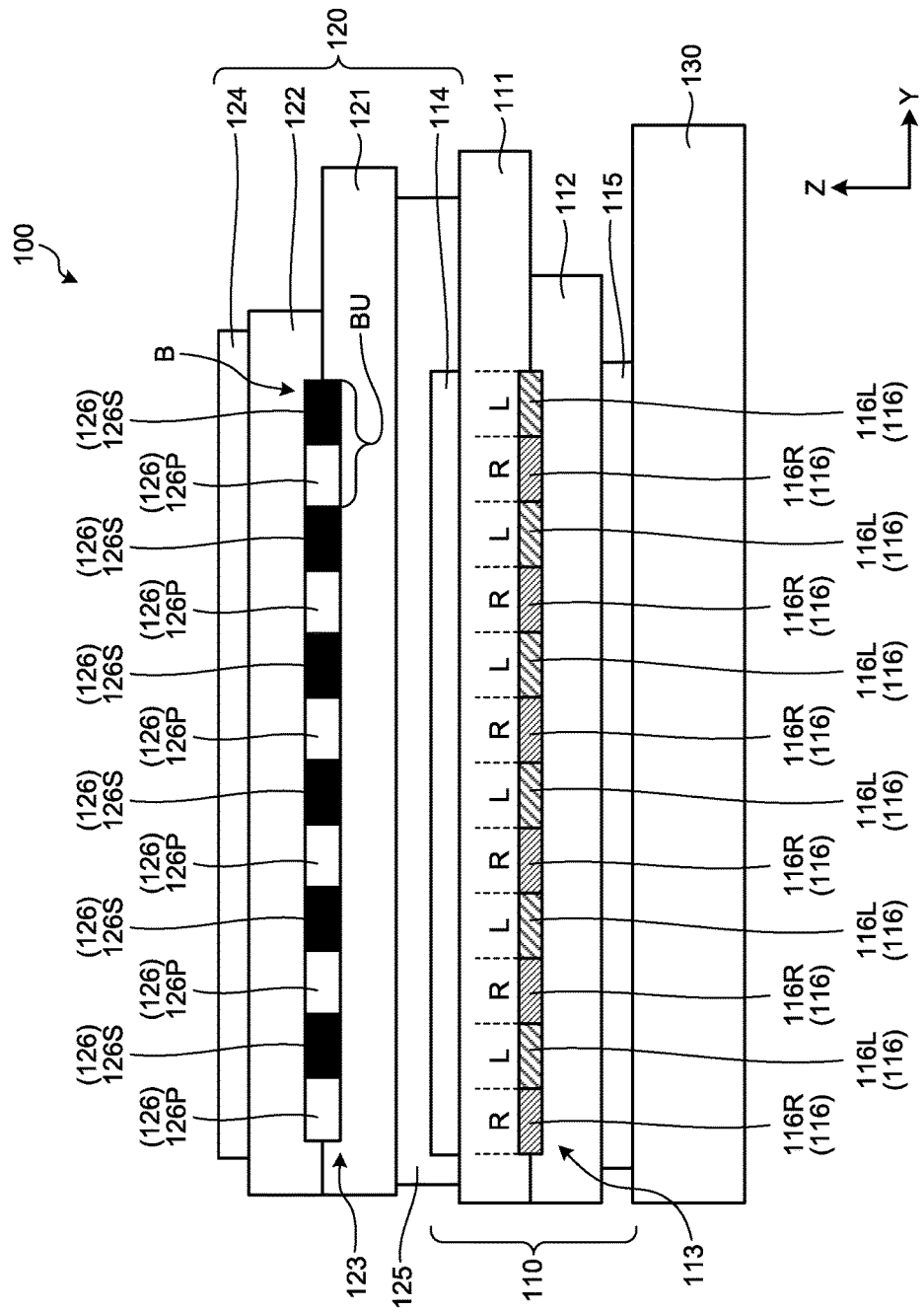
FIG. 2 is a cross-sectional view illustrating a schematic configuration of an image forming unit.

FIG. 2 is a cross-sectional view illustrating a schematic configuration of the image forming unit 100.

The image forming unit 100 includes, for example, the display unit 110, the separator 120, and the illuminator 130. In the descriptions below, a side on which an image is observed by the observer U is referred to as a "front surface side" while the opposite side to the side on which an image is observed by the observer U is referred to as a "back surface side" to describe a configuration of respective members. Arrangement of respective members is described using an XYZ rectangular coordinate system having a first direction in which a plurality of viewpoint images are aligned as a Y direction and a direction from the display unit 110 toward the separator 120 (normal direction with respect to a display surface) as a Z direction.

The display unit 110 includes: a forth substrate 111; a third substrate 112 opposite to the forth substrate 111; a liquid crystal layer 113 arranged between the forth substrate 111 and the third substrate 112; a first polarizing plate 114 arranged on an outer surface side of the forth substrate 111 (the opposite side to the liquid crystal layer 113); and a second polarizing plate 115 arranged on an outer surface side of the third substrate 112 (the opposite side to the liquid crystal layer 113). Illumination light emitted from the illuminator 130 is transmitted by the second polarizing plate 115, enters the liquid crystal layer 113, and then is modulated by the liquid crystal layer 113. The illumination light modulated by the liquid crystal layer 113 is transmitted by the first polarizing plate 114 and then displayed as an image.

A display mode of the display unit 110 is not specifically limited. A vertical electric field mode using a vertical electric field (electric field in the thickness direction of the liquid crystal layer 113) or a horizontal electric field mode using a horizontal electric field (electric field in a direction perpendicular to the thickness direction of the liquid crystal layer 113) may be employed. Examples of the vertical electric field mode include, but are not limited to, an electrically controlled birefringence mode (ECB), a twisted nematic mode (TN), and a vertical alignment mode (VA). Examples of a horizontal electric field mode include, but are not limited to, an in-plane switching (IPS) mode.

The display unit 110 includes a plurality of pixels in a matrix form on the third substrate 112. The plurality of pixels display an image for the first mode or the second mode. One pixel includes multiple subpixels each of which display a different color. Colors displayed by the plurality of subpixels may be in any combination. For example, one pixel may include three subpixels separately displaying three colors of red, green, and blue. One pixel may include three subpixels separately displaying three colors of cyan, yellow, and magenta. One pixel may include four or more subpixels in order to extend the color gamut. A subpixel to display white may be included in order to obtain a bright image. Examples of a subpixel to display white include, but are not limited to, a subpixel disposed with a colorless transparent color filter and a subpixel disposed with no color filter.

When display is carried out in the first mode, the display unit 110 displays a plurality of image areas 116 each corresponding to the plurality of viewpoint images alternately aligned in the first direction (Y direction). The plurality of image areas 116 may be formed in a strip pattern along one side of a rectangular pixel or may be formed in a step pattern along two sides of the rectangular pixel. When the image areas 116 are formed into a strip pattern, a longitudinal direction of the image area 116 is a direction parallel to the one side of the pixel. When the image areas 116 are formed into a step pattern, a longitudinal direction of the image area 116 is a direction obliquely crossing the one side of the pixel. The plurality of image areas 116 are alternately aligned in a direction perpendicular to the longitudinal direction of the image area 116.

Each of the plurality of image areas 116 is formed by a plurality of pixels or a plurality of subpixels aligned in a strip pattern or a step pattern, for example. In FIG. 2, for example, a plurality of right-eye image areas 116R and a plurality of left-eye image areas 116L are displayed in an alternately aligned manner in the first direction (Y direction). The plurality of right-eye image areas 116R display the right-eye viewpoint image R while the plurality of left-eye image areas 116L display the left-eye viewpoint image L.

A front surface side of the display unit 110 is provided with the separator 120 via an adhesive layer 125. The separator 120 includes: a first substrate 121; a second substrate 122 opposite to the first substrate 121; a liquid crystal layer 123 arranged between the first substrate 121 and the second substrate 122; the first polarizing plate 114 arranged on an outer surface side of the first substrate 121 (the opposite side to the liquid crystal layer 123); and a third polarizing plate 124 arranged on an outer surface side of the second substrate 122 (the opposite side to the liquid crystal layer 123). The first polarizing plate 114 is common to the first polarizing plate 114 of the display unit 110. Illumination light transmitted by the first polarizing plate 114 is modulated by the liquid crystal layer 123. The illumination light modulated by the liquid crystal layer 123 is transmitted by the third polarizing plate 124 and then observed by an observer.

In FIG. 2, the first polarizing plate 114 is arranged on the forth substrate 111, whereover the first substrate 121 is arranged via the adhesive layer 125. However, the first polarizing plate 114 may be arranged on the first substrate 121, whereunder the forth substrate 111 may be arranged via the adhesive layer 125.

A display mode of the separator 120 is not specifically limited. A vertical electric field mode using a vertical electric field (electric field in the thickness direction of the liquid crystal layer 123) or a horizontal electric field mode using a horizontal electric field (electric field in a direction perpendicular to the thickness direction of the liquid crystal layer 123) may be employed. Examples of a vertical electric field mode include, but are not limited to, an ECB mode, a TN mode, and a VA mode. Examples of a horizontal electric field mode include, but are not limited to, an IPS mode.

The separator 120 includes, for example, a plurality of shutters 126 capable of controlling transmittance of light. Individual transmittance of the plurality of shutters 126 is controlled by a separator control signal input to the separator 120. A voltage applied to the individual liquid crystal layers 123 of the plurality of shutters 126 is controlled by the separator control signal, thereby controlling a modulation amount of the individual liquid crystal layers 123 of the plurality of shutters 126.

For example, the plurality of shutters 126 are individually controlled by the separator control signal to be in one of an on-state where a voltage is applied to the liquid crystal layer 123 and an off-state where a voltage is not applied to the liquid crystal layer 123. When the shutter 126 is in the off-state, a polarization direction of illumination light entering the shutter 126 is adjusted to a direction that is absorbed by the third polarizing plate 124. Therefore, transmittance in the shutter 126 becomes low. When the shutter 126 is in the on-state, a polarization direction of illumination light entering the shutter 126 is adjusted to a direction that is transmitted by the third polarizing plate 124. Therefore, transmittance in the shutter 126 becomes high.

As illustrated in FIG. 2, when display is carried out in the first mode, the separator 120 forms a plurality of shutters 126S which have relatively low transmittance and a plurality of shutter 126P which have relatively high transmittance. In other words, the separator 120 provides a voltage to the plurality of the shutter 126S for reducing transmittance. This results in formation of the image separator B as a parallax barrier. The image separator B is formed by the plurality of shutters 126S and the plurality of shutter 126P. When display is carried out in the second mode, transmittance is kept high in all the shutters 126.

When display is carried out in the first mode, a plurality of light-shielding units ST having a low transmittance (refer to FIGS. 9 and 11) and a plurality of transmitting units PT having a high transmittance (refer to FIGS. 9 and 11) are formed in an alternately aligned manner in the separator 120. In the present embodiment, the plurality of the light shielding units and the plurality of the light transmitting units are formed band-shaped. A single unit separator BU includes a light shielding unit ST and a transmitting unit PT. The image separator B is formed by a plurality of unit separators BU aligned in the direction in which the image areas 116 are aligned (Y direction). In the example in FIG. 2, each of the light-shielding unit ST or the transmitting unit PT is formed by the single shutter 126; however, the number of shutters 126 that form each of the light-shielding unit ST or the transmitting unit PT is not limited to one. For example, in FIG. 9 and FIG. 10, the light-shielding unit ST forms by six shutters 126S and the transmitting unit PT forms by six shutters 126P.

A pitch PC of the unit separators BU for separating and thereby supplying a plurality of viewpoint images to the both eyes of the observer U observing the center of an image at an appropriate vision position is calculated by the following mathematical formula (1).

$$PC = p \times E / (p/2 + E) \quad (1)$$

p: pitch for the right-eye image areas 116R or the left-eye image areas 116L

E: interpupillary distance between the right eye and the left eye of the observer U (e.g. 64 mm)

A pitch means a distance between corresponding points or lines of adjacent two structures in an alignment direction when the structures having the same shape are aligned at predetermined equally spaced intervals. For example, the pitch PC refers to a distance between the central points or edge portions of the adjacent two unit separators BU. The pitch PC is calculated as, for example, the total value of the width of one light-shielding unit ST in the Y direction and the width of one transmitting unit PT in the Y direction.

The pitch p means a pitch of the image areas 116 corresponding to one viewpoint image. The right-eye image areas 116R or the left-eye image areas 116L are arranged next to each other and thus a pitch of the right-eye image areas 116R and a pitch of the left-eye image areas 116L are equivalent. The pitch p is calculated as, for example, the total value of the width of one right-eye image area 116R in the Y direction and the width of one left-eye image area 116L in the Y direction.

The width of the image area 116 in the Y direction may be any value. The image area 116 may be formed by a line of pixels or subpixels extending in a strip pattern or a step pattern or may be formed by as plurality of lines of pixels or subpixels extending in a strip pattern or a step pattern.

The plurality of shutters 126 may be in any shape. The plurality of shutters 126 in a strip pattern or a step pattern corresponding to the shape of the image area 116 may be provided in alignment in the separator 120 while aligned in one direction or two directions. For example, the plurality of shutters 126 in a strip pattern corresponding to the shape of the image area 116 are provided in alignment in the Y direction in the separator 120. However, the plurality of rectangular shutters 126 may be arranged in the separator 120 in the X direction and the Y direction in a matrix form. A pitch of the plurality of shutters 126 in the alignment direction of the plurality of image areas 116 is preferably smaller than a pitch of the plurality of image areas 116. This allows for fine adjustment of the position of the image separator B according to the position of the observer U.

The pitch of the shutters 126 is, for example, smaller than a half the pitch of the image area 116. When the position of the observer U in the alignment direction of the image area 116 is detected and the position of the unit separator BU is changed according to the position of the observer U, the pitch of the shutters 126 is preferably less than or equal to one-sixth of the pitch of the image area 116.

A back surface side of the display unit 110 is provided with the illuminator 130. The illuminator 130 illuminates the display unit 110 from a back surface side thereof. Illumination light emitted from the illuminator 130 is transmitted by the display unit 110 and the separator 120 and then observed by the observer U. The illumination light transmitted by the display unit 110 is displayed as an image. When display is carried out in the first mode, the illumination light transmitted by the display unit 110 is displayed as an image including the plurality of viewpoint images (for example the right-eye viewpoint image R and the left-eye viewpoint image L). The plurality of viewpoint images included in the image are separated by the image separator B formed in the separator 120. The separated viewpoint images separately enters the right eye and the left eye of the observer U. This allows the observer U to observe a stereoscopic image.

Figure 3:
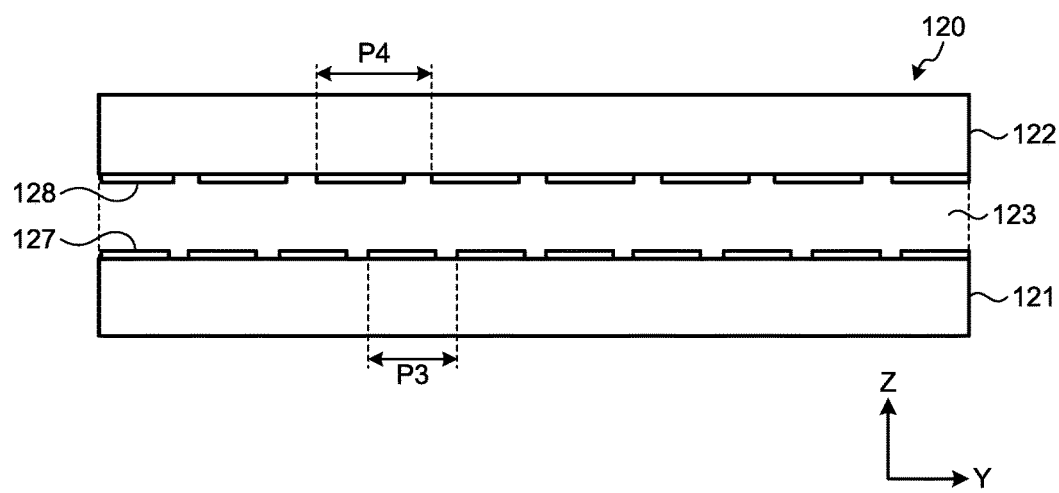
FIG. 3 is a cross-sectional view illustrating a configuration of a separator.
Figure 4:
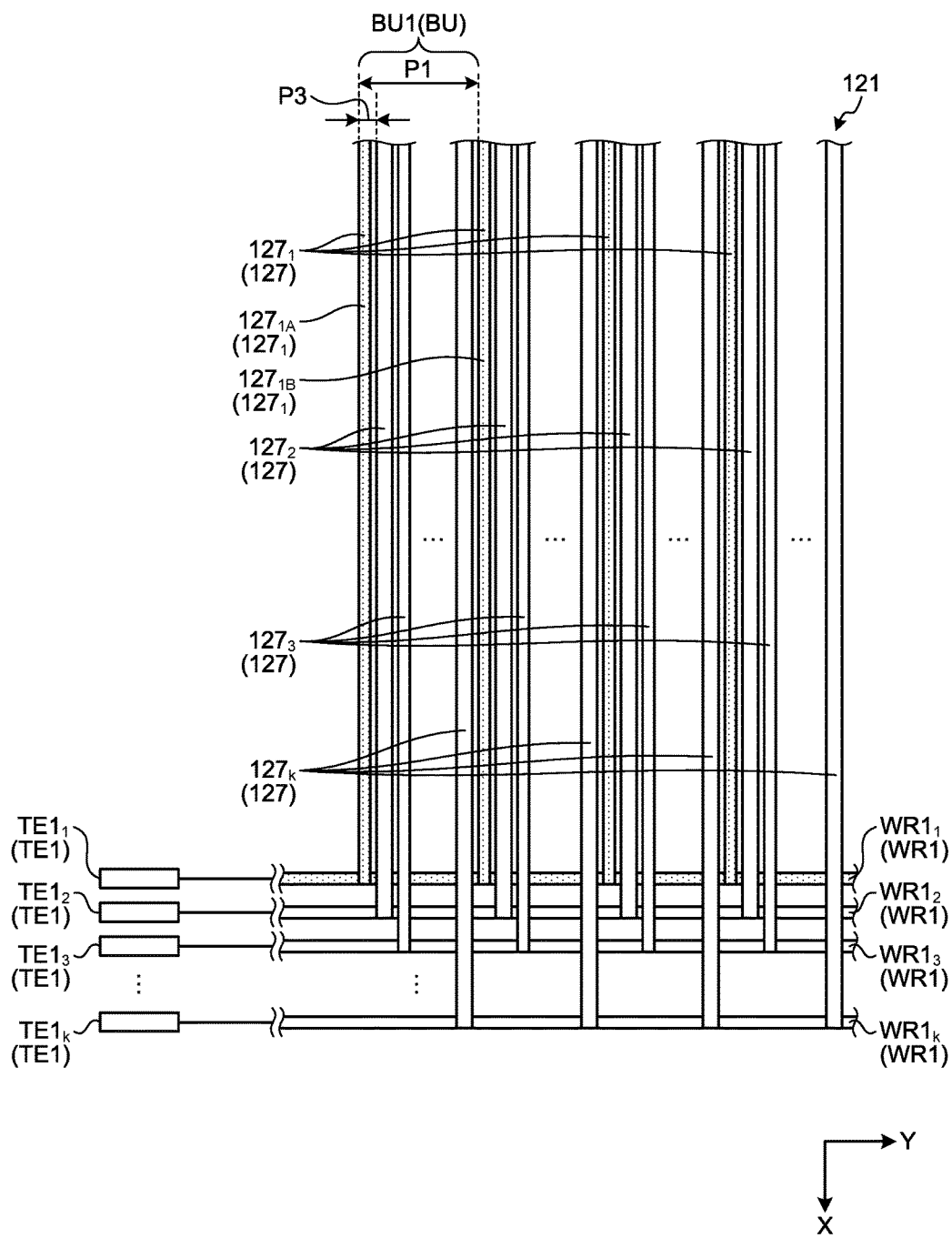
FIG. 4 is a plan view illustrating a configuration of a first substrate of the separator.
Figure 5:
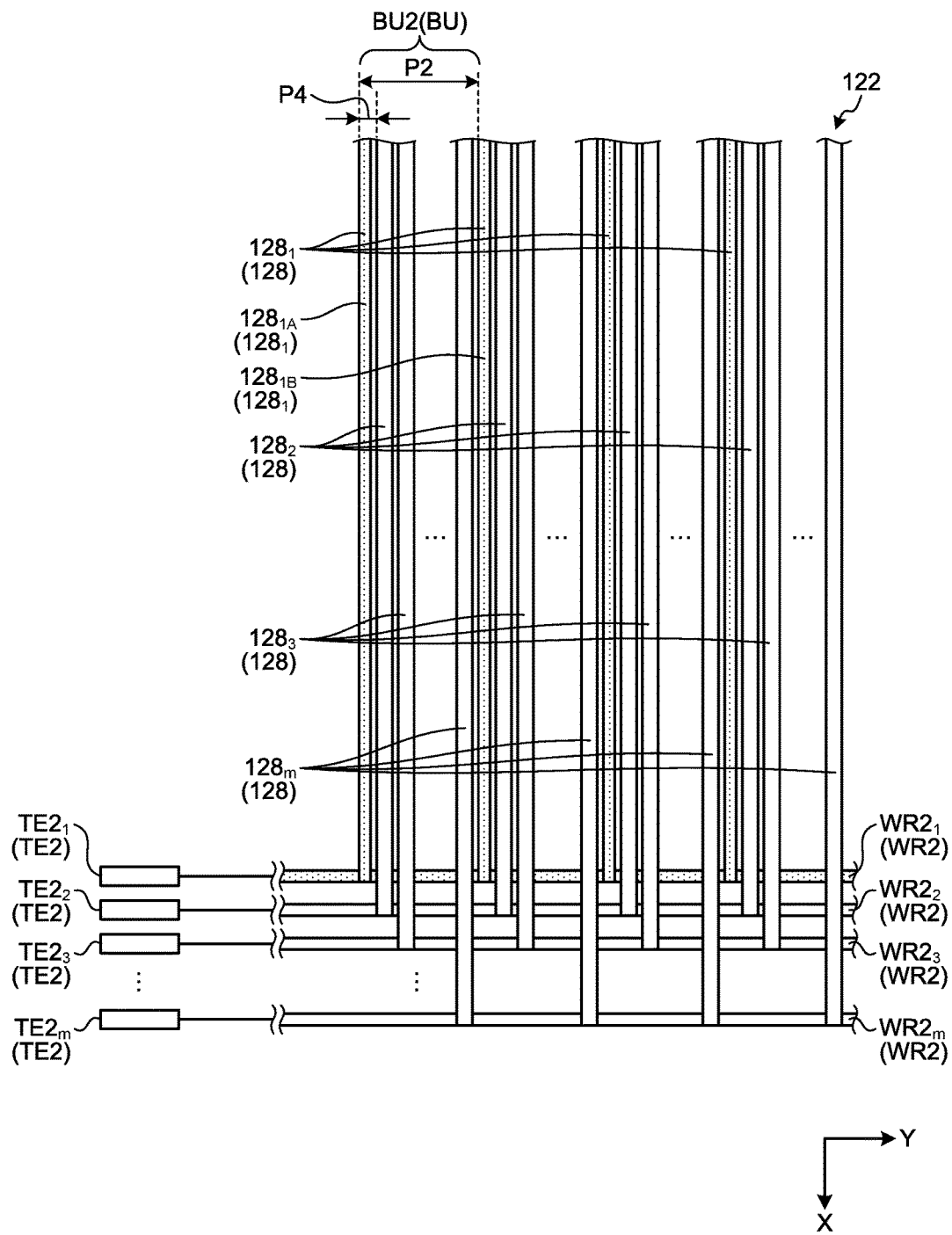
FIG. 5 is a plan view illustrating a configuration of a second substrate of the separator.
Figure 6:
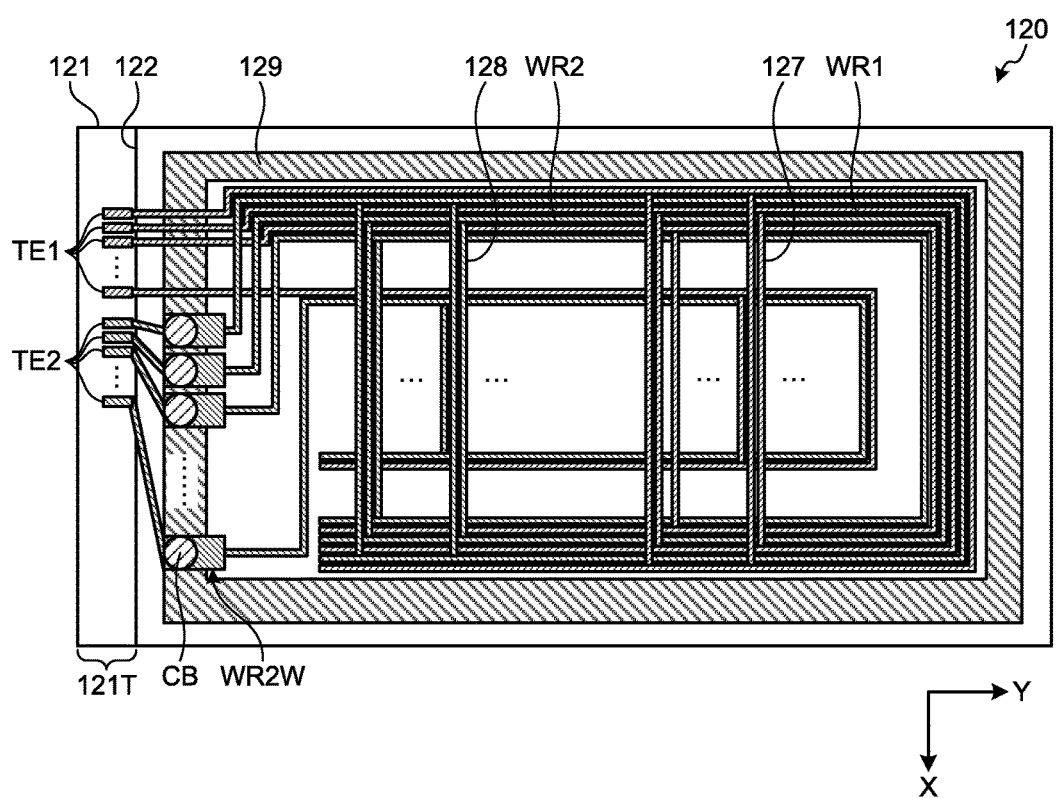
FIG. 6 is a plan view illustrating arrangement of electrodes, wiring, and terminals of the separator.
Figure 7:
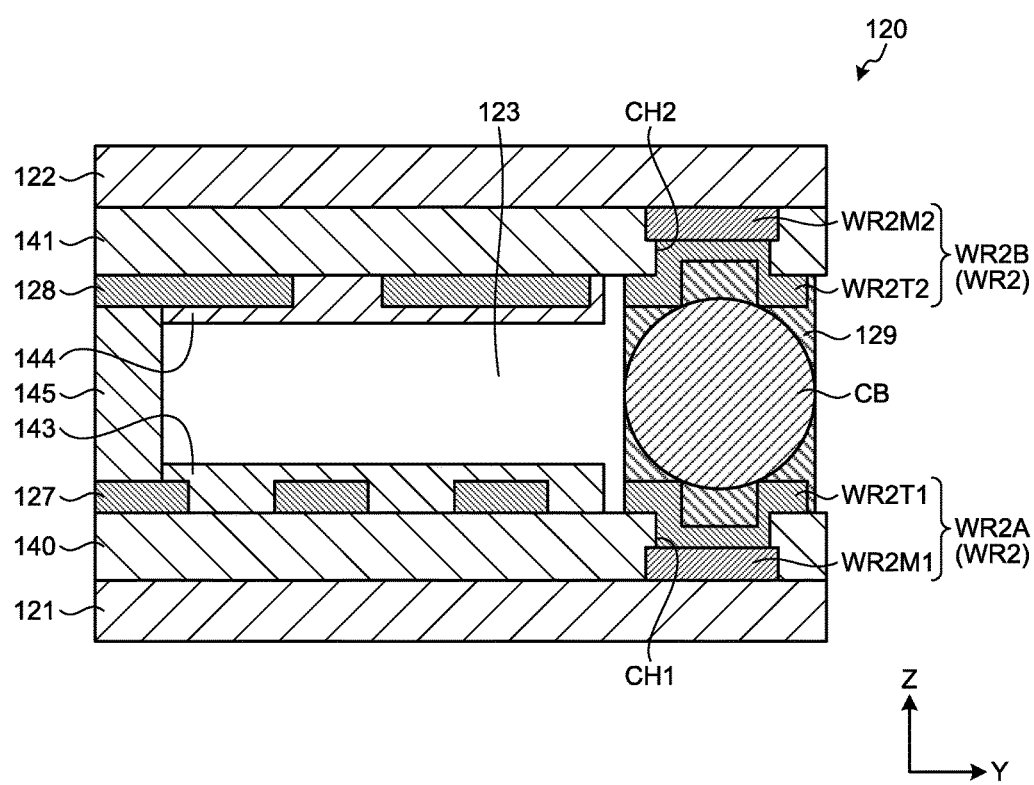
FIG. 7 is a cross-sectional view illustrating a configuration of a terminal portion and the vicinity thereof in the separator.

FIG. 3 is a cross-sectional view illustrating a configuration of the separator 120. FIG. 4 is a plan view illustrating a configuration of the first substrate 121 of the separator 120. FIG. 5 is a plan view illustrating a configuration of the second substrate 122 of the separator 120. FIG. 6 is a plan view illustrating arrangement of electrodes, wiring, and terminals of the separator 120. FIG. 7 is a cross-sectional view illustrating a configuration of a terminal portion 121T and the vicinity thereof in the separator 120.

As illustrated in FIGS. 3 to 5, the first substrate 121 is provided with a plurality of first electrodes 127 that form the plurality of first unit separators BU1 at a first pitch P1. The second substrate 122 is provided with a plurality of second electrodes 128 that form the plurality of second unit separators BU2 at a second pitch P2 which is different from the first pitch P1. An electric field generated between the plurality of first electrodes 127 and the plurality of second electrodes 128 results in formation of each of the plurality of the first unit separators UB1 or the plurality of the second unit separators BU2 (see FIGS. 9 and 11). The separator 120 includes the plurality of first electrodes 127 and the plurality of second electrodes 128 arranged opposite to each other with the liquid crystal layer 123 interposed therebetween. Of the first pitch P1 and the second pitch P2, the larger pitch is a non-integral multiple (e.g. less than a double) of the smaller pitch.

The plurality of first electrodes 127 are arranged in alignment in the Y direction at a third pitch P3. The plurality of second electrodes 128 are arranged in alignment in the Y direction at a fourth pitch P4. The third pitch P3 and the fourth pitch P4 may be equivalent to each other or may be different from each other. In the present embodiment, for example, the third pitch P3 and the fourth pitch P4 are different from each other. Of the third pitch P3 and the fourth pitch P4, the larger pitch (PL) is a non-integral multiple (e.g. less than a double) of the smaller pitch (PS). For example, the larger pitch is more than or equal to 1.0001 times and less than twice the smaller pitch, preferably 1.0005 times to 1.1 times. In the present embodiment, for example, the third pitch P3 is smaller than the fourth pitch P4 and the first pitch P1 is smaller than the second pitch P2. The width of the first electrode 127 in the Y direction is smaller than the width of the second electrode 128 in the Y direction.

As illustrated in FIG. 4, end portions of the first electrodes 127 are electrically connected to first wiring WR1 (WR1$_1$ to WR1$_k$) extending in a direction crossing the first electrodes 127. In the example in FIG. 4, the number of pieces of the first wiring WR1 is k (where k is an integral of two or more). Every other (k-1) electrodes of the plurality of first electrodes 127 are electrically connected to the same piece of the first wiring WR1. The plurality of first electrodes 127 are divided into multiple (k) groups by short-circuiting of every other electrodes or every other multiple electrodes of the first electrodes 127.

Every other (k-1) electrodes of the plurality of first electrodes 127 are concurrently driven by the same piece of the first wiring WR1. The k first electrodes 127 (127$_1$ to 127$_k$) adjacent to each other are electrically connected to different pieces of the first wiring WR1 and independently controlled of driving thereof. A pitch of the plurality of first electrodes 127 concurrently driven is the first pitch P1 of the first unit separators BU1 (see FIG. 9). The first pitch P1 is an integral multiple (k times) of the third pitch P3. The third pitch P3 is smaller than the first pitch P1. Two or more first electrodes 127, that are included in the plurality of the first electrodes 127 and are present at the first pitch P1, are short-circuited via the same piece of the first wiring WR1. For example, the plurality of the first electrodes 127 include one electrode 127$_{1A}$ and an adjacent electrodes 127$_{1B}$ adjacent to the one electrode 127$_{1A}$ at the first pitch. The one electrode 127$_{1A}$ and the adjacent electrode 127$_{1B}$ are connected via the same wiring (WR1$_1$). An end portion of the first wiring WR1 is provided with first terminals TE1 (TE1$_1$ to TE1$_k$). The number of first terminals TE1 is k, which is the same as the number of pieces of the first wiring WR1. In other words, the number of the plurality of the first electrodes 127 which forms the first unit separator BU1 is k.

As illustrated in FIG. 5, end portions of the second electrodes 128 are electrically connected to second wiring WR2 (WR2$_1$ to WR2$_m$) extending in a direction crossing the second electrodes 128. In the example in FIG. 5, the number of pieces of the second wiring WR2 is m (where m is an integral of two or more). Every other (m-1) electrodes of the plurality of second electrodes 128 are electrically connected to the same piece of the second wiring WR2. The plurality of second electrodes 128 are divided into multiple (m) groups by short-circuiting of every other electrodes or every other multiple electrodes of the second electrodes 128.

Every other (m-1) electrodes of the plurality of second electrodes 128 are concurrently driven by the same piece of the second wiring WR2. The m second electrodes 128 (128$_1$ to 128$_m$) adjacent to each other are electrically connected to different pieces of the second wiring WR2 and independently controlled of driving thereof. A pitch of the plurality of second electrodes 128 concurrently driven is the second pitch P2 of the second unit separators BU2 (see FIG. 11). The second pitch P2 is an integral multiple (m times) of the fourth pitch P4. The fourth pitch P4 is smaller than the second pitch P2. Two or more second electrodes 128, that are included in the plurality of the second electrodes 128 and are present at the second pitch P2, are short-circuited via the same piece of the second wiring WR2. For example, the plurality of the second electrodes 128 include one electrode 128$_{1A}$ and an adjacent electrode 128$_{1B}$ adjacent to the one electrode 128$_{1A}$ at the second pitch. The one electrode 128$_{1A}$ and the adjacent electrode 128$_{1B}$ are connected via the same wiring (WR2$_1$). An end portion of the second wiring WR2 is provided with second terminals TE2 (TE2$_1$ to TE2$_m$). The number of second terminals TE2 is m, which is the same as the number of pieces of the second wiring WR2. In other words, the number of the plurality of the second electrodes 128 which forms the first unit separator BU2 is m.

As illustrated in FIG. 6, the first substrate 121 includes a terminal portion 121T protruding outward from the second substrate 122. In the example in FIG. 6, for example, the terminal portion 121T is provided along one side of the first substrate 121. In the terminal portion 121T, the plurality of first terminals TE1 and the plurality of second terminals TE2 are arranged in alignment in a longitudinal direction of the terminal portion 121T (direction along the side of the first substrate 121). The plurality of first terminals TE1 and the plurality of second terminals TE2 are applied with a separator-generating electric potential and a common potential via a flexible printed circuit substrate (hereinafter referred to as "FPC").

The first substrate 121 and the second substrate 122 are bonded to each other by a seal material 129. The seal material 129 is provided as in a frame shape along peripherals of an opposing area where the first substrate 121 and the second substrate 122 are facing each other. In an area encircled by the first substrate 121, the second substrate 122, and the seal material 129, the liquid crystal layer 123 (see FIG. 3) is formed. The first wiring WR1 and the second wiring WR2 separately extends along an inner periphery of the seal material 129 to the terminal portion 121T. The first wiring WR1 and the second wiring WR2 are, for example, provided in a U-letter shape along three sides of the seal material 129 formed in a rectangular shape and electrically connected to both end portions of the corresponding first electrode 127 or the second electrode 128. Positional relation between the seal material 129 and the wiring is not limited to the one in FIG. 6.

As illustrated in FIG. 7, the second wiring WR2 includes a first wiring unit WR2A provided to the first substrate 121 and a second wiring unit WR2B provided to the second substrate 122. The first wiring unit WR2A and the second wiring unit WR2B are, for example, electrically connected to each other by a conductive particle CB mixed in the seal material 129. An end portion of each of the first wiring unit WR2A and the second wiring unit WR2B opposite to each other while interposing the seal material 129 is provided with a wide unit WR2W (see FIG. 6). Electrical connection between the wide units WR2W mitigates connection resistance between the first wiring unit WR2A and the second wiring unit WR2B.

A position where the conductive particles CB are mixed may be a part of or the entire seal material 129. Even when the conductive particles CB are mixed in the entire seal material 129, a conduction characteristic has anisotropy when the density of the conductive particles CB is small. Therefore, no short-circuit occurs between adjacent pieces of wiring. Therefore, a part of the seal material 129 and a part of the first wiring WR1 or the second wiring WR2 may overlap. The first wiring unit WR2A and the second wiring unit WR2B may be alternatively electrically connected to each other by the conductive particles CB arranged outside the seal material 129. For example, the wide unit WR2W may be provided outside the seal material 129 and paste containing the conductive particles CB may be interposed between the first substrate 121 and the second substrate 122 in an area where the wide unit WR2W is arranged.

The first wiring unit WR2A includes, for example, a metal layer WR2M1 and a transparent conducive layer WR2T1. The transparent conducive layer WR2T1 is laminated on the metal layer WR2M1 via an insulating layer 140 and electrically connected to the metal layer WR2M1 via a contact hole CH1. The transparent conducive layer WR2T1 is, for example, formed by the same transparent conductive material as that of the first electrode 127. The second wiring unit WR2B includes a metal layer WR2M2 and a transparent conducive layer WR2T2. The transparent conducive layer WR2T2 is laminated on the metal layer WR2M2 via an insulating layer 141 and electrically connected to the metal layer WR2M2 via a contact hole CH2. The transparent conducive layer WR2T2 is, for example, formed by the same transparent conductive material as that of the second electrode 128.

A spacer 145 is provided between the first substrate 121 and the second substrate 122. The diameter of the conductive particle CB is, for example, slightly larger than the height of the spacer 145. The conductive particle CB is, for example, interposed between the first substrate 121 and the second substrate 122 in a compressed and deformed form. The spacer 145 may be a column-shaped spacer or a ball-shaped spacer. A column-shaped spacer is formed on the first substrate 121 or the second substrate 122 by photolithography. A ball-shaped spacer is arranged on the first substrate 121 or the second substrate 122 by spraying. In FIG. 7, the separator 120 includes a first orientation film 143 on the first substrate 121 and a second orientation film 144 on the second substrate 122. The first orientation film 143 and the second orientation film 144 control a default orientation state of the liquid crystal layer 123.

Figure 8:
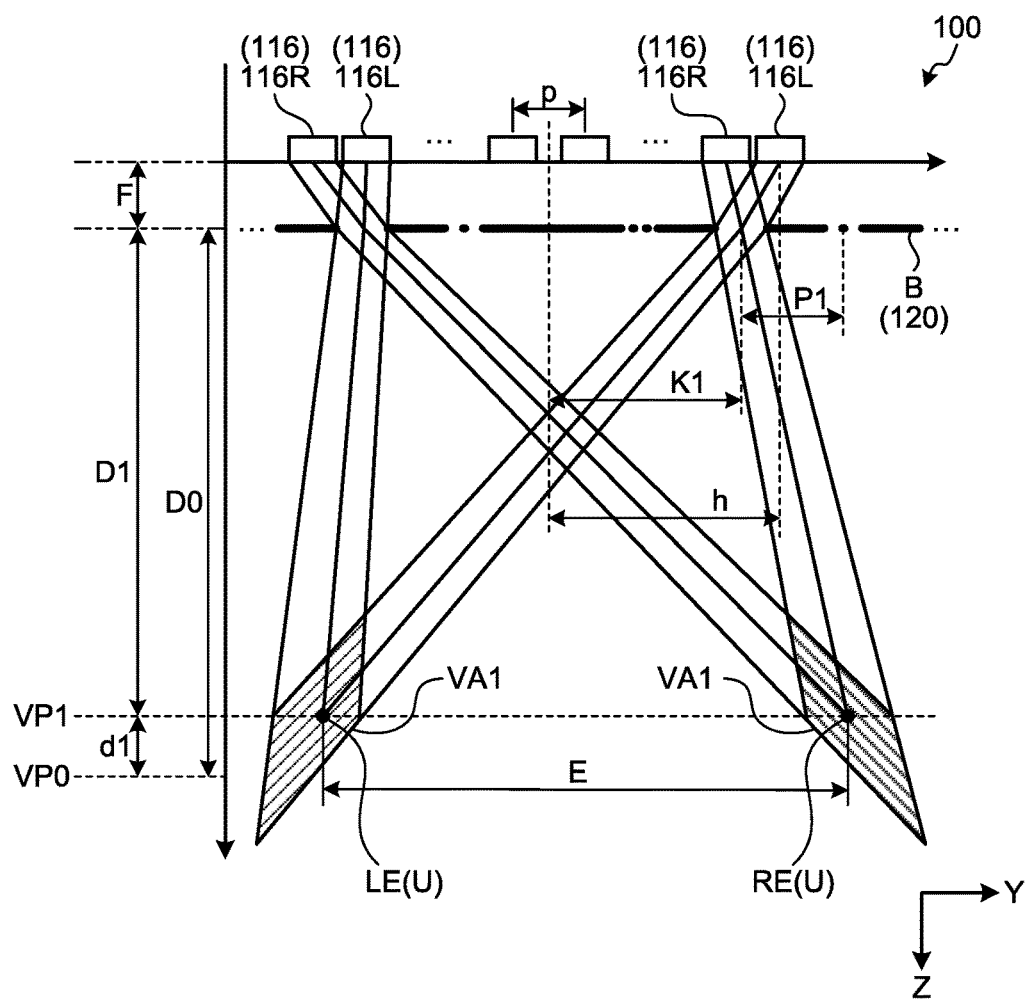
FIG. 8 is a diagram explaining operations when unit separators are formed at a first pitch.
Figure 9:
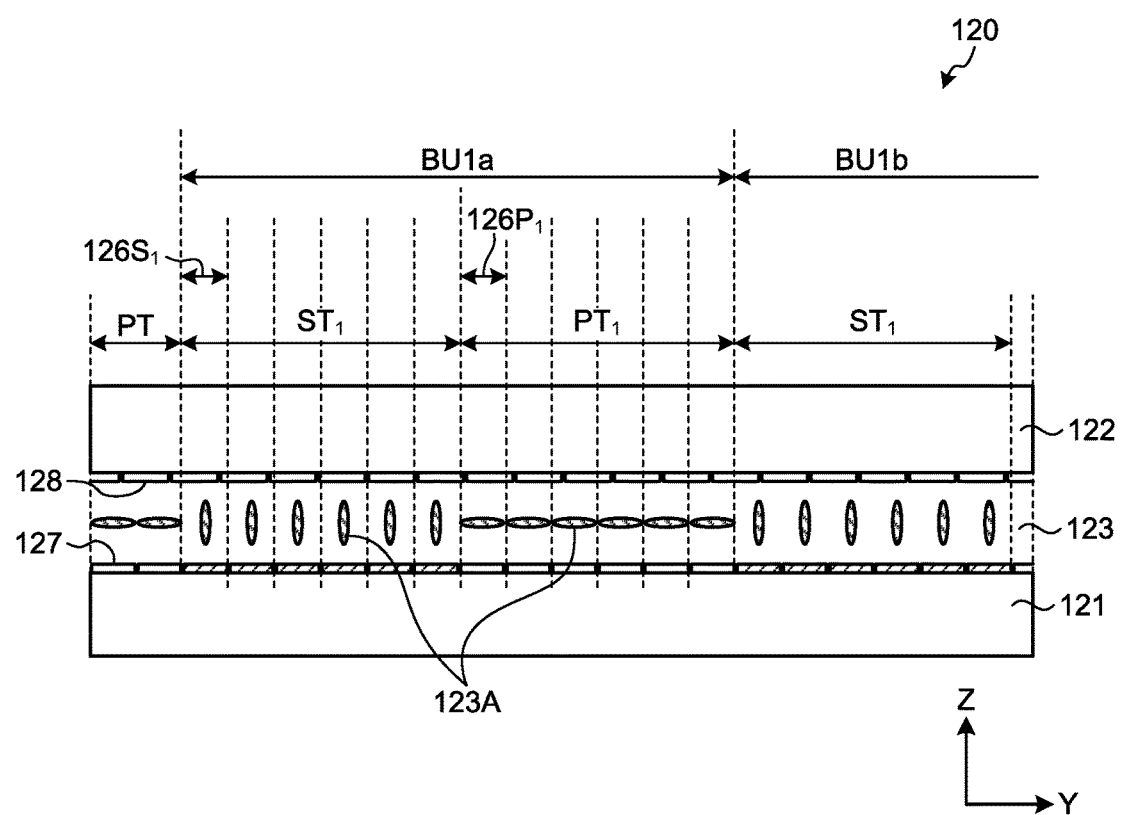
FIG. 9 is a diagram explaining operations when the unit separators are formed at the first pitch.
Figure 10:
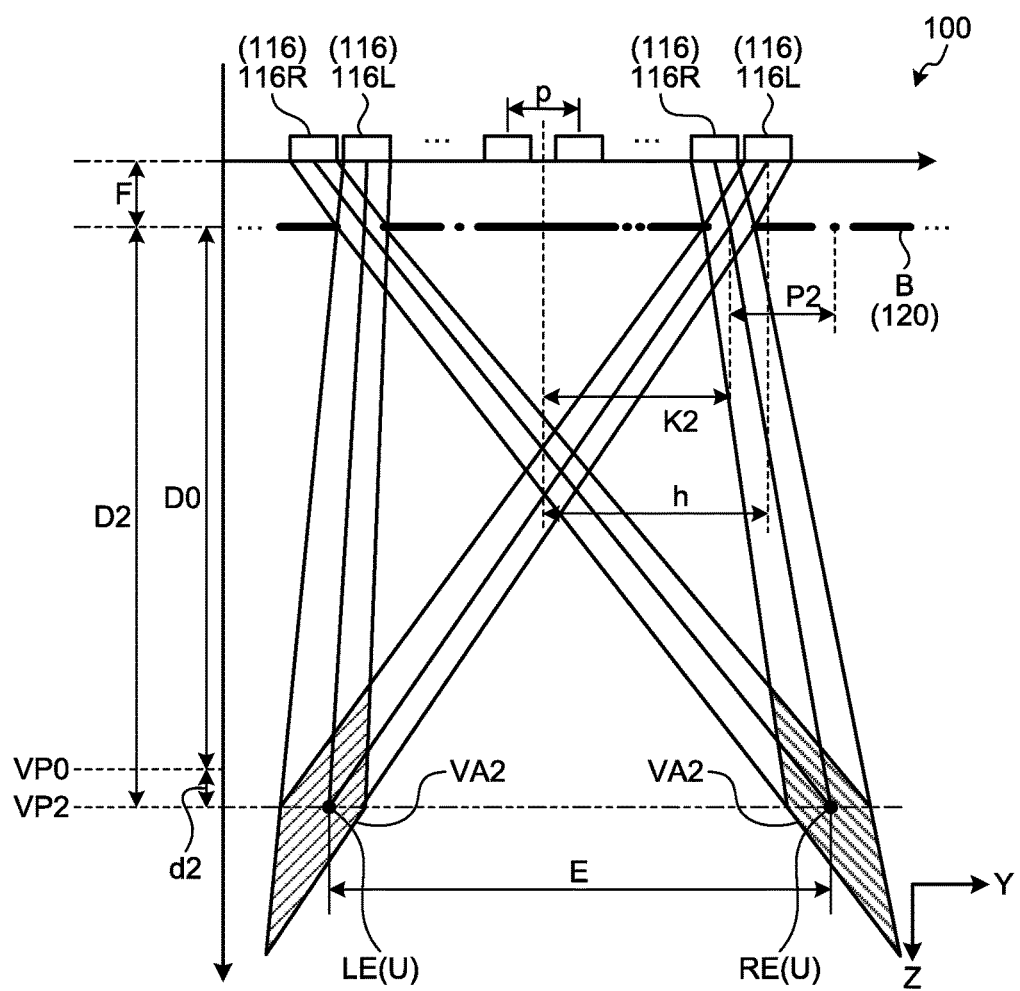
FIG. 10 is a diagram explaining operations when the unit separators are formed at a second pitch.
Figure 11:
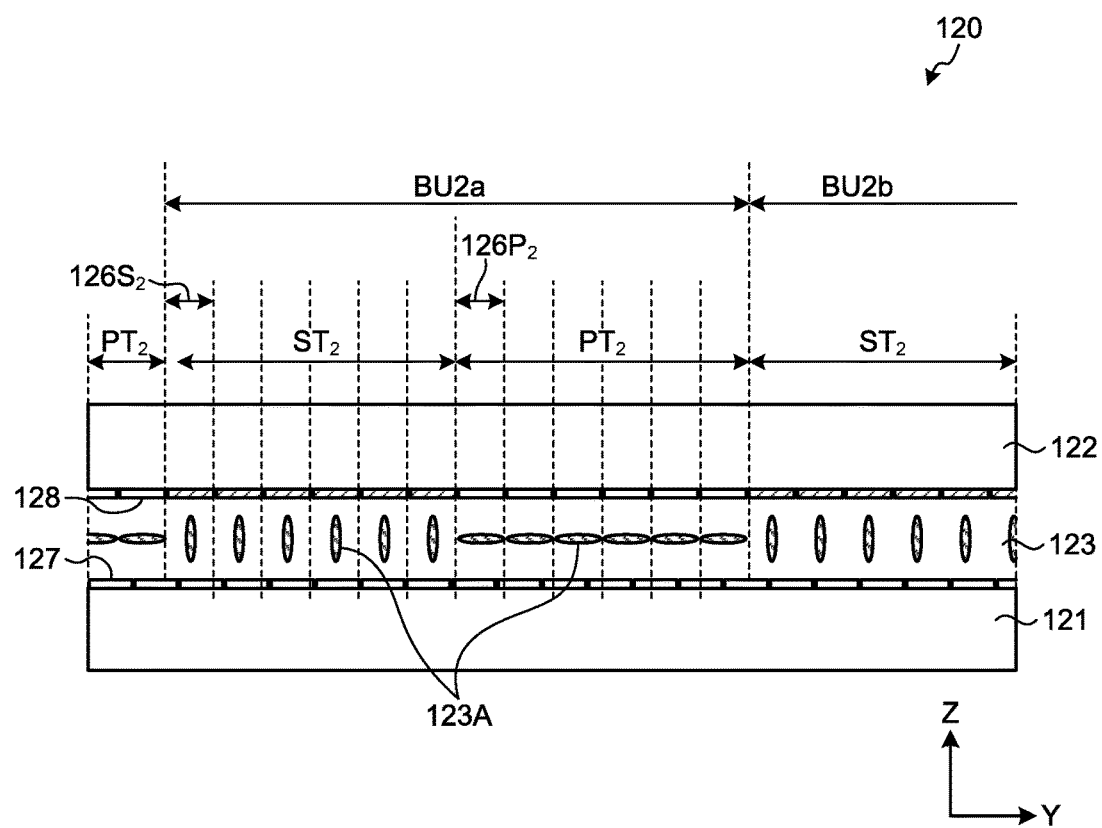
FIG. 11 is a diagram explaining operations when the unit separators are formed at the second pitch.
Figure 12:
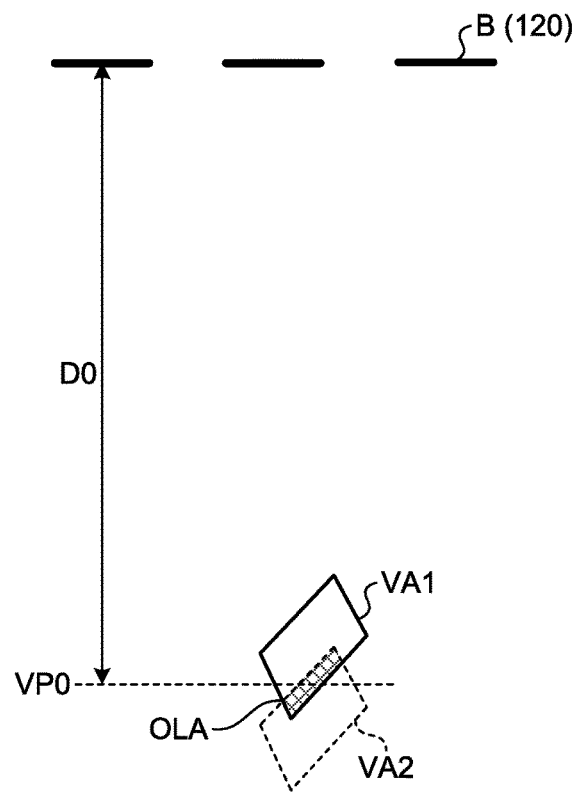
FIG. 12 is a diagram illustrating relation between a first vision area and a second vision area.

FIGS. 8 and 9 are diagrams explaining operations of the separator 120 when the first unit separators BU1 are formed at the first pitch P1. FIG. 10 and FIG. 11 are diagrams explaining operations of the separator 120 when the second unit separators BU2 are formed at the second pitch P2. FIG. 12 is a diagram illustrating relation between a first vision area VA1 when the first unit separators BU1 are formed at the first pitch P1 and a second vision area VA2 when the second unit separators BU2 are formed at the second pitch P2. In FIGS. 9 and 11, a hatched electrode represents an electrode applied with a separator-generating electric potential. An electrode not hatched represents an electrode applied with a common potential. In FIGS. 9 and 11, examples where the numbers k and m illustrated in FIGS. 4 and 5 are 6 are illustrated.

Likeliness of occurrence of crosstalk is different depending on a position on a display area that the observer U observes. The display area is an area in the display unit 110 where a plurality of pixels are arranged. For example, it is assumed that the observer U observes an image from a position opposite to the center of the display area of the display unit 110. In this case, crosstalk is more likely to occur when the center of the display area is observed than when an end portion of the display area is observed. When an observation area, where the size of crosstalk is less than or equal to a specific size, is regarded as a vision area, the entire vision area is determined by a vision area for observing the end portion of the display area. When a distance between the observer U and the image forming unit 100 changes, a position and a pitch of the unit separators BU for appropriately observing an end portion of an image changes. Therefore, electrodes for forming the unit separators BU are switched between the first electrodes 127 and the second electrodes 128 according to the distance between the observer U and an image. As illustrated in FIG. 8, the first unit separators BU1 are formed at the first pitch P1 when the observer U observes an image from a near position. Meanwhile, as illustrated in FIG. 10, the second unit separators BU2 are formed at the second pitch which is larger than the first pitch P1 when the observer U observes an image from a distant position.

As illustrated in FIG. 9, when the first unit separators BU1 are formed at the first pitch P1, the plurality of first electrodes 127 arranged at the first pitch P1 are applied with a separator-generating electric potential while the rest of the plurality of first electrodes 127 and all the second electrodes 128 are applied with a common potential. The separator-generating electric potential and the common potential may have any magnitude. For example, the separator-generating electric potential has a high level (e.g. 6 V) and the common potential has a low level (e.g. 0 V).

Orientation of liquid crystal 123A in a part opposite to the first electrodes 127 applied with the separator-generating electric potential changes, thereby forming the shutter $126S_1$ having a width corresponding to the width of the first electrode 127. The plurality of shutters $126S_1$ where transmittance is reduced form the plurality of light-shielding units ST aligned at the first pitch P1. Orientation of the liquid crystal 123A in a part opposite to the first electrodes 127 applied with the common potential does not change. Therefore, an area opposite to the first electrodes 127 applied with the common potential forms the shutters $126P_1$ having a high transmittance. The plurality of shutters $126P_1$ having a high transmittance form the plurality of transmitting units PT aligned at the first pitch P1. In other words, a width between one unit separator BU1a of the first unit separators BU1 and adjacent unit separator BU1b of the first unit separators BU1 adjacent to the one unit separator BU1a is the first pitch P1.

As illustrated in FIG. 8, the plurality of unit first separators BU1 formed at the first pitch P1 form the first vision area VA1 at a position apart from the image forming unit 100 by a specific distance in the Z direction. The center of the first vision area VA1 is arranged at a position closer to the image forming unit 100 than from a first reference position VP0 set in advance. The first reference position VP0 is, for example, a position (appropriate visual position) apart from the image forming unit 100 by an appropriate visual distance D0 in the Z direction. Regarding a pitch P0 calculated by the following mathematical formulas (2) and (3) as a reference pitch, the first pitch P1 is smaller than, for example, the reference pitch P0. The reference pitch P0 is a pitch optimal for separating and thereby supplying a plurality of viewpoint images to the both eyes of the observer U observing at an appropriate vision position.

$$\tan(a \sin(\sin(a \tan((E/2+K0)/D0))/r))=(h-K0)/F \qquad (2)$$

$$P0=K0/N \qquad (3)$$

K0: distance from the center of the separator 120 to an end portion of the separator 120 h: distance from the center of the display unit 110 to an end portion of the display unit 110

F: distance from the separator 120 to the display unit 110 r: refractive index of members between the liquid crystal layer in the separator 120 and the liquid crystal layer in the display unit 110

E: interpupillary distance between the right eye RE and the left eye LE of the observer U (e.g. 64 mm)

N: the number of viewpoint images controlled by the image separator B

The center of the separator 120 refers to the central position, in the Y direction, of the separator 120 or the central position in the Y direction in an area where the image separators B are formed. The end portion of the separator 120 refers to, for example, the central position of the transmitting unit PT at the outermost end in the Y direction.

The center of the display unit 110 refers to the central position, in the Y direction, of the display unit 110 or the central position in the Y direction in an area where the pixels are formed. The end portion of the display unit 110 refers to, for example, the central position in the outermost image area visually recognized via the separator 120 in the Y direction. The center of the separator 120 and the center of the display unit 110 may be equivalent to each other.

The distance from the separator 120 to the display unit 110 refers to, for example, a distance from the liquid crystal layer 113 in the display unit 110 to the liquid crystal layer 123 in the separator 120.

The refractive index of members between the liquid crystal layer 123 in the separator 120 and the liquid crystal layer 113 in the display unit 110 may be an average refractive index of multiple members or a refractive index of a member having the greatest refractive index when there are multiple members between the liquid crystal layer in the separator 120 and the liquid crystal layer in the display unit 110.

The number of viewpoint images controlled by the image separator B refers to the number of units in the entire display unit when the image area 116 visually recognized after transmission by one transmitting unit PT is regarded as one unit. Specifically, the number of image areas that form one viewpoint image (right-eye viewpoint image R or left-eye viewpoint image L) is the number N of viewpoint images.

As illustrated in FIG. 11, when the second unit separators BU2 are formed at the second pitch P2, the plurality of second electrodes 128 arranged at the second pitch P2 are applied with the separator-generating electric potential while the rest of the plurality of second electrodes 128 and all the first electrodes 127 are applied with the common potential. Switching between the separator-generating electric potential and the common potential is controlled by the separator control signal.

Orientation of the liquid crystal 123A in a part opposite to the second electrodes 128 applied with the separator-generating electric potential changes, thereby forming the shutter $126S_2$ having a width corresponding to the width of the second electrodes 128. The plurality of shutters $126S_2$ where transmittance is reduced form the plurality of light shielding units ST aligned at the second pitch P2. Orientation of the liquid crystal 123A in a part opposite to the second electrodes 128 applied with the common potential does not change. Therefore, an area opposite to the second electrodes 128 applied with the common potential forms the shutters $126P_2$ having a high transmittance. The plurality of shutters $126P_2$ having a high transmittance form the plurality of transmitting units PT aligned at the second pitch P2. In other words, a width between one unit separator BU2$a$ of the second unit separators BU2 and adjacent unit separator BU2$b$ of the second unit separators BU2 adjacent to the one unit separator BU2$a$ is the second pitch P2.

As illustrated in FIG. 10, the plurality of second unit separators BU2 formed at the second pitch P2 form the second vision area VA2 at a position apart from the image forming unit 100 by a specific distance in the Z direction. The center of the second vision area VA2 is arranged at a position farther from the image forming unit 100 than the first reference position VP0. The second pitch P2 is larger than the reference pitch P0, for example.

In the present embodiment, for example, the first pitch P1 and the second pitch P2 are calculated by the following mathematical formulas (4) to (7), respectively. The first pitch P1 is a pitch optimal for the observer U to observe an image from a position (position apart from the image forming unit 100 by a distance D1 in the Z direction) closer to the image forming unit 100 than from the first reference position VP0 by a distance d1. The second pitch P2 is a pitch optimal for the observer U to observe an image from a position (position apart from the image forming unit 100 by a distance D2 in the Z direction) farther from the image forming unit 100 than from the first reference position VP0 by a distance d2.

$$P1 = K1/N \tag{4}$$

$$\tan(a\,\sin(\sin(a\,\tan((K1+E/2)/(D0-d1)))/r)) = (h-K1)/F \tag{5}$$

$$P2 = K2/N \tag{6}$$

$$\tan(a\,\sin(\sin(a\,\tan((K2+E/2)/(D0+d2)))/r)) = (h-K2)/F \tag{7}$$

K1: distance from the center of the separator 120 to an end portion of the separator 120 when a viewpoint distance is (D0−d1)

K2: distance from the center of the separator 120 to an end portion of the separator 120 when a viewpoint distance is (D0+d2)

As illustrated in FIG. 12, the first vision area VA1 and the second vision area VA2, for example, partially overlap. A part of the first vision area VA1 and the second vision area VA2 are coupled via an overlapping area OLA. The size of the first pitch P1 and the second pitch P2 are separately set such that the first vision area VA1 and the second vision area VA2 include the overlapping area OLA. The first reference position VP0 is included in the overlapping area OLA.

For example, when the observer U observes an image from a position closer to the image than from the first reference position VP0, the unit separators BU (in the present embodiment the first unit separators BU1) are formed at a smaller pitch of the first pitch P1 and the second pitch P2 (in the present embodiment the first pitch P1). The results in formation of the first vision area VA1 at a position closer to the image forming unit 100 than from a first reference position VP0. When the observer U observes an image from a position farther from the image than from the first reference position VP0, the unit separators BU (in the present embodiment the second unit separators BU2) are formed at a larger pitch of the first pitch P1 and the second pitch P2 (the second pitch P2 in the present embodiment). The results in formation of the second vision area VA2 at a position farther from the image forming unit 100 than from the first reference position VP0. The first vision area VA1 and the second vision area VA2 partially overlaps and thus switching between the first vision area VA1 and the second vision area VA2 is unlikely to generate discomfort to the observer U.

In the present embodiment, the first pitch P1 is smaller than the reference pitch P0 and the second pitch P2 is larger than the reference pitch P0 in order to form a wide vision area across a front part and a rear part of the first reference position VP0. The first pitch P1 and the second pitch P2 are, however, not necessarily different from the reference pitch P0. For example, one of the first pitch P1 and the second pitch P2 may correspond to the reference pitch P0. Such a configuration forms a wide vision area in at least one of a front side or a back side of the first reference position VP0.

Hereinafter, operations of the controller 200 and the detector 300 when display is carried out in the first mode will be described with reference to FIGS. 1, 4, 5, 8, and 10.

The image analyser 320 supplies a signal related to positional information of the observer U to the controller 200 every certain period of time. The positional information acquisitor 240 acquires positional information related to a position of the observer U every certain period of time (positional information acquisition step). The positional information acquired by the positional information acquisitor 240 is supplied to the controller 200.

The separator controller 220 supplies the separator control signal to the separator 120 in accordance with a timing supplied with the signal related to the positional information. Individual transmittance of the plurality of shutters 126 included in the separator 120 is controlled by the separator control signal based on the positional information of the observer U. As a result, the separator 120 changes a position of the image separator B based on the positional information of the observer U (separator control step).

The display unit 110 modulates illumination light emitted from the illuminator 130 and thereby displays an image including a plurality of viewpoint images (display step).

In the separator control step, the separator controller 220 applies the separator-generating electric potential for generating the plurality of unit separators BU by switching to one of the first electrodes 127 and the second electrodes 128 based on the positional information of the observer U.

For example, when the observer U observes an image from a first position VP1 closer to the image than from the first reference position VP0, the separator controller 220 apply the separator-generating electric potential to the first electrodes 127 capable of forming the first unit separators BU1 at the first pitch P1. The separator controller 220 selects one or more first terminals TE1 from among the k first terminals TE1 illustrated in FIG. 4 and applies the separator-generating electric potential to the selected one or more first terminals TE1. The separator controller 220 applies the common potential to one or more first terminals TE1 that are not selected and the m second terminals TE2 illustrated in FIG. 5. As a result of this, every g (g is an integral of one or more) first electrodes 127 arranged in alignment by every other k first electrodes 127 are applied with the separator-generating electric potential while the rest of the plurality of first electrodes 127 and all the second electrodes 128 are applied with the common potential.

The width of the light-shielding unit $ST_1$ of the first unit separator BU1 varies according to the number of the first terminals TE1 concurrently selected. In the present embodiment, the first unit separators BU1 are formed by the light-shielding unit $ST_1$ and the transmitting unit $PT_1$. According to the number of first terminals TE1 concurrently selected, a ratio of the light-shielding unit $ST_1$ to the transmitting unit $PT_1$ is controlled. A ratio of the light-shielding unit $ST_1$ to the transmitting unit $PT_1$ may be equivalent or different. When a ratio of the light-shielding unit $ST_1$ is greater than a ratio of the transmitting unit $PT_1$, crosstalk is likely to be suppressed. For example, when a ratio of the light-shielding unit $ST_1$ is 70% or more, crosstalk rarely occurs.

A position of the first terminal TE1 applied with the separator-generating electric potential may be changed according to transfer of the observer U in the Y direction. When a position of the first terminal TE1 applied with the separator-generating electric potential changes, luminance of the light-shielding unit ST and the transmitting unit PT varies due to a difference between rise time and fall time of the liquid crystal layer 123 in the separator 120. When the number of electrodes included in one light-shielding unit $ST_1$ or one transmitting unit $PT_1$ is small, the ratio of the first electrodes 127, where a potential changes when a position of the first terminal TE1 applied with the separator-generating electric potential changes, becomes large and thus luminance variation becomes large. Therefore, either of the number of first terminals TE1 concurrently applied with the separator-generating electric potential and the number of first terminals TE1 not applied with the separator-generating electric potential is preferably three or more. That is, the number of first electrodes 127 included in one light-shielding unit $ST_1$ or one transmitting unit $PT_1$ is preferably three or more. This suppresses variations in luminance of the light-shielding unit $ST_1$ and the transmitting unit $PT_1$ when a position of the first terminal TE1 applied with the separator-generating electric potential changes.

When the observer U observes an image from a second position VP2 farther from the image than from the first reference position VP0, the separator controller 220 applies the separator-generating electric potential to the second electrodes 128 capable of forming the second unit separators BU2 at the second pitch P2. The separator controller 220 selects one or more second terminals TE2 from among the m second terminals TE2 illustrated in FIG. 5 and applies the separator-generating electric potential to the selected one or more second terminals TE2. The separator controller 220 applies the common potential to one or more second terminals TE2 that are not selected and the k first terminals TE1 illustrated in FIG. 4. As a result of this, every h (h is an integral of one or more) second electrodes 128 arranged in alignment by every other m second electrodes 128 are applied with the separator-generating electric potential while the rest of the plurality of second electrodes 128 and all the first electrodes 127 are applied with the common potential.

The width of the light shielding unit $ST_2$ of the second unit separator BU2 varies according to the number of the second terminals TE2 concurrently selected. According to the number of second terminals TE2 concurrently selected, a ratio of the light-shielding unit $ST_2$ to the transmitting unit $PT_2$ is controlled. A ratio of the light-shielding unit $ST_2$ to the transmitting unit $PT_2$ may be equivalent or different. When a ratio of the light-shielding unit $ST_2$ is greater than a ratio of the transmitting unit $PT_2$, crosstalk is likely to be suppressed. For example, when a ratio of the light-shielding unit $ST_2$ is 70% or more, crosstalk rarely occurs.

A position of the second terminal TE2 applied with the separator-generating electric potential may be changed according to transfer of the observer U in the Y direction. Either of the number of second terminals TE2 concurrently applied with the separator-generating electric potential and the number of second terminals TE2 not applied with the separator-generating electric potential is preferably three or more. That is, the number of second electrodes 128 included in one light-shielding unit $ST_2$ or one transmitting unit $PT_2$ is preferably three or more. This suppresses variations in luminance of the light-shielding unit $ST_2$ and the transmitting unit $PT_2$ when a position of the second terminal TE2 applied with the separator-generating electric potential changes.

The separator controller 220 controls switching between the separator-generating electric potential and the common potential by the separator control signal. The separator controller 220 controls the width in the Y direction of each light-shielding unit ST of first unit separator BU by the number of first terminals TE1 or second terminals TE2 applied with the separator-generating electric potential. For example, the width in the Y direction of the light-shielding unit $ST_1$ of the first unit separator BU1 when the observer U observes the image from the first position VP1 is smaller than the width in the Y direction of the light-shielding unit $ST_2$ of the second unit separator BU2 when the observer U observes the image from the second position VP2 that is farther from the image than from the first position VP1.

The separator controller 220 may move, in a direction parallel to the Y direction, a position of the plurality of first electrodes 127 or the plurality of second electrodes 128 applied with the separator-generating electric potential, for example, when the observer U moves in a direction parallel to the Y direction. A position of the electrode applied with the separator-generating electric potential is changed by changing a terminal applied with the separator-generating electric potential. As a result of this, positions where the plurality of unit separators BU are formed move in a direction parallel to the Y direction when the observer U moves in a direction parallel to the Y direction.

For example, when the plurality of the light-shielding unit $ST_1$ of the first unit separators BU1 are formed by applying the separator-generating electric potential to the plurality of first electrodes 127, shifting positions of the first terminals TE1 applied with the separator-generating electric potential one by one results in changing positions in the Y direction of the light-shielding unit $ST_1$ of the plurality of first unit separators BU1 by a plurality of phases (k phases). When the plurality of the light-shielding unit $ST_2$ of the second unit separators BU2 are formed by applying the separator-generating electric potential to the plurality of second electrodes 128, shifting positions of the second terminals TE2 applied with the separator-generating electric potential one by one results in changing positions in the Y direction of the light-shielding unit $ST_2$ of the plurality of second unit separators BU2 by a plurality of phases (m phases).

As described above, in the display device 1 of the present embodiment, the plurality of patterned electrodes (first electrodes 127 and second electrodes 128) are formed on both of the first substrate 121 and the second substrate 122 of the separator 120. Therefore, differentiating a pitch of the first electrodes 127 from that of the second electrodes 128 that are concurrently driven allows for forming two types of unit separators BU having different pitches. Each pitch can be freely designed and thus the two vision areas (first vision area VA1 and second vision area VA2) corresponding to each of the pitches can be caused to partially overlap by slightly differentiating the two pitches. This allows for providing the display device 1 having a wide vision area.

Second Embodiment

Figure 13:
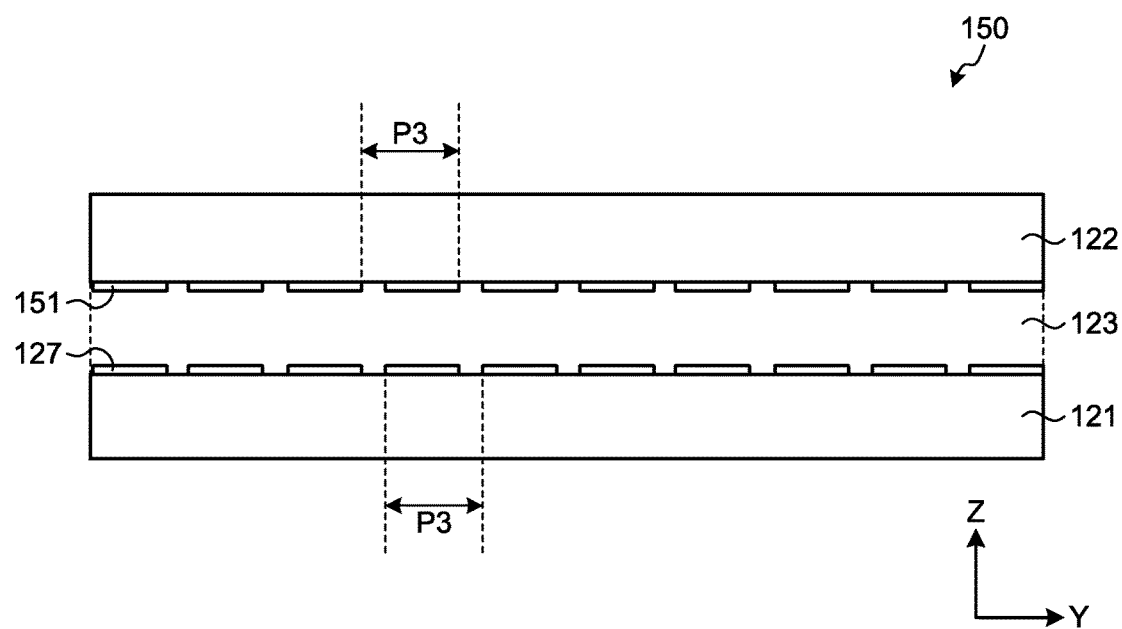
FIG. 13 is a cross-sectional view illustrating a configuration of a separator according to a second embodiment.

FIG. 13 is a cross-sectional view illustrating a configuration of a separator 150 according to a second embodiment. FIG. 14 is a plan view illustrating a configuration of a second substrate 122 of the separator 150. In the present embodiment, a component common to that in the first embodiment is denoted with the same symbol and detailed descriptions thereon are omitted.

As illustrated in FIG. 13, a point in the present embodiment different from the first embodiment is that a plurality of second electrodes 151 are arranged at the third pitch P3. In the present embodiment, the width of a second electrode 151 is equivalent to the width of a first electrode 127.

As illustrated in FIG. 14, in the present embodiment differentiating a combination of second electrodes 151 short-circuited to each other from that of first electrodes 127 results in implementing the second pitch P2 different from the first pitch P1. In the example in FIG. 14, the number of pieces of the second wiring WR2 is i (where i is an integral of two or more which is different from k). Every other (i-1) electrodes of the plurality of second electrodes 151 are electrically connected to the same piece of the second wiring WR2. The plurality of second electrodes 151 are divided into multiple (i) groups by short-circuiting of every other electrodes or every other multiple electrodes of the second electrodes 151.

Every other (i-1) electrodes of the plurality of second electrodes 151 are concurrently driven by the same piece of the second wiring WR2. The i second electrodes 151 ($151_1$ to $151_i$) adjacent to each other are electrically connected to different pieces of the second wiring WR2 and independently controlled of driving thereof. A pitch of the plurality of second electrodes 151 concurrently driven is the second pitch P2 of the second unit separators BU2. The second pitch P2 is an integral multiple (i times) of the third pitch P3. Two or more second electrodes 151, that are included in the plurality of the second electrodes 151 and are present at the second pitch P2, are short-circuited via the same piece of the second wiring WR2. For example, the plurality of second electrodes 151 include one electrode $151_{1A}$ and an adjacent electrode $151_{1B}$ adjacent to the one electrode $151_{1A}$ at the second pitch. The one electrode $151_{1A}$ and the adjacent electrode $151_{1B}$ are connected via the same wiring ($WR2_1$). An end portion of the second wiring WR2 is provided with second terminals TE2 ($TE2_1$ to $TE2_i$). The number of second terminals TE2 is i, which is the same as the number of pieces of the second wiring WR2. In other words, the number of the plurality of the second electrodes 151 which forms the second unit separator BU2 is i.

Also in the present embodiment, differentiating a pitch of the first electrodes 127 from that of the second electrodes 151 that are concurrently driven allows for forming two types of unit separators BU having different pitches. Two vision areas (first vision area VA1 and second vision area VA2) corresponding to each of the pitches can be caused to partially overlap by slightly differentiating the two pitches. This allows for providing a display device having a wide vision area.

Third Embodiment

Figure 15A:
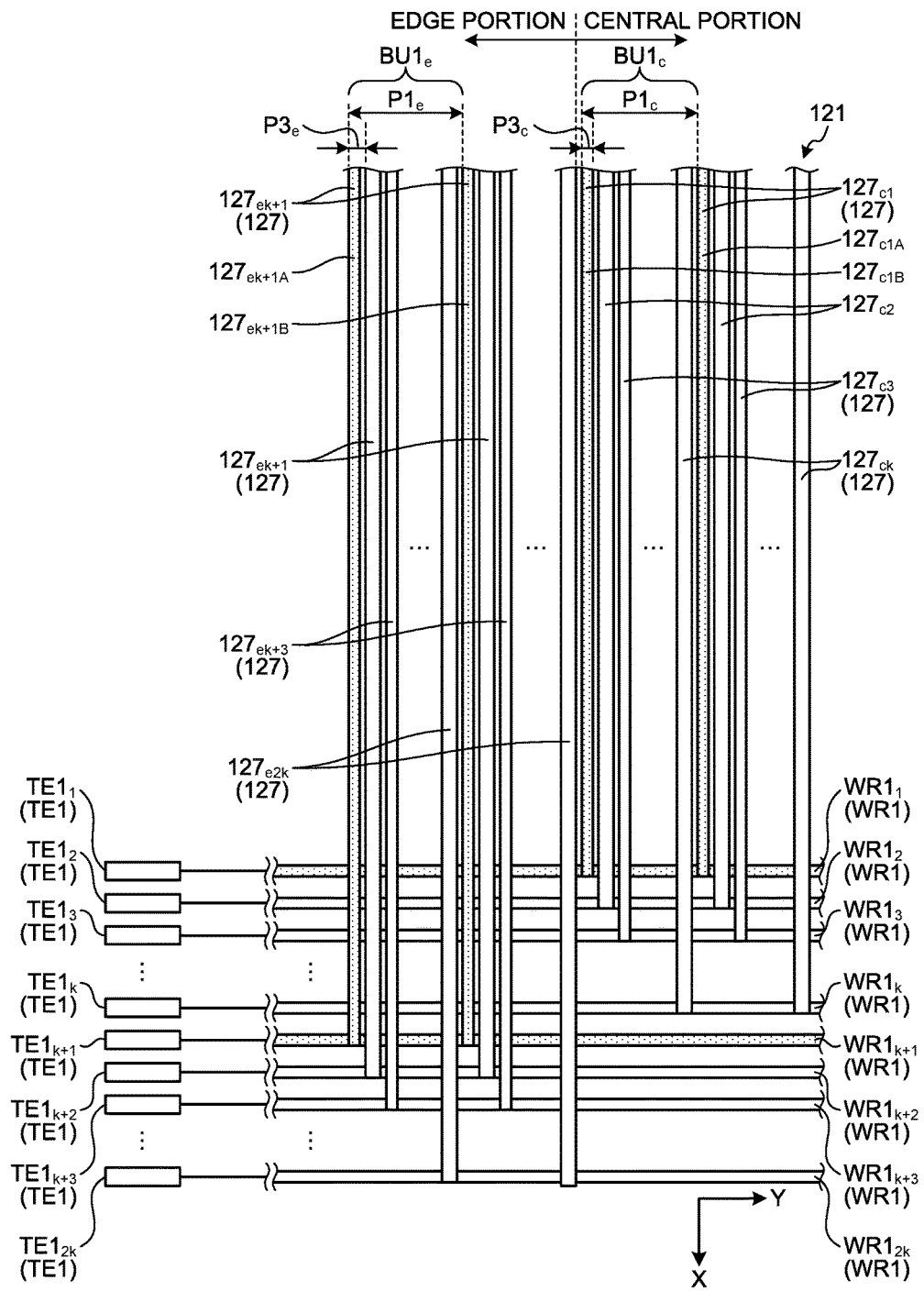
FIG. 15A is a plan view illustrating a configuration of a first substrate of a separator according to a third embodiment.
Figure 15B:
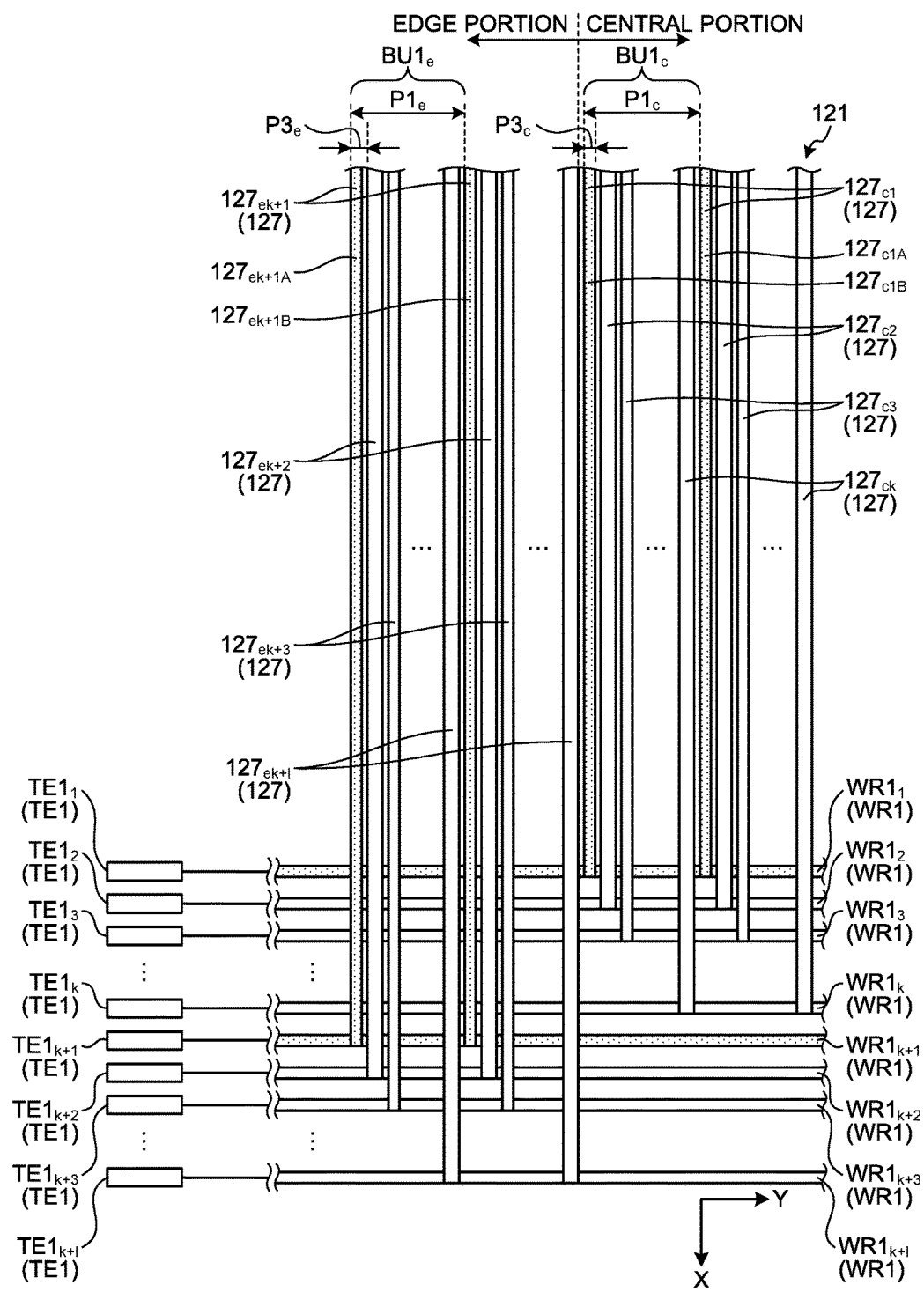
FIG. 15B is a plan view illustrating another configuration of a first substrate of a separator according to a third embodiment.
Figure 17:
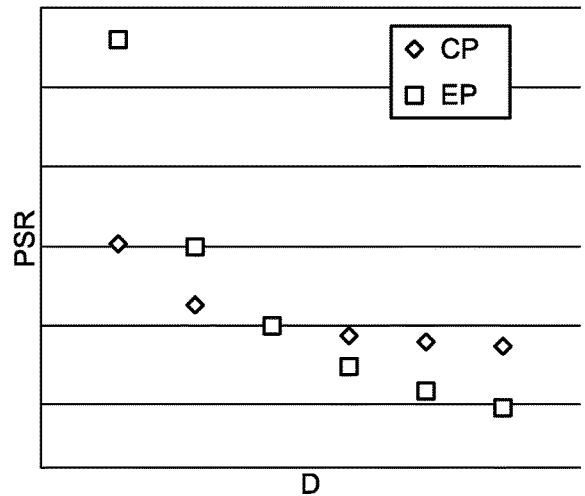
FIG. 17 is a diagram illustrating relation between a visual distance and an amount of shift of observation position.

FIG. 15A is a plan view illustrating a configuration of a first substrate 121 according to a third embodiment. FIG. 15B is a plan view illustrating another configuration of a first substrate 121 according to a third embodiment. FIG. 16 is a plan view illustrating a configuration of a second substrate 122 according to a third embodiment. FIG. 17 is a diagram illustrating how much a position where an observer U observes an image via image separators B is shifted when a distance (visual distance) D in the Z direction between the observer U and an image forming unit 100 changes. In FIG. 17, the horizontal axis represents the visual distance D and the vertical axis represents the amount of shift PSR of a position of observation. In the legend, CP represents the amount of shift PSR upon observing the central portion of an image and EP represents the amount of shift PSR upon observing an end portion of the image. In the present embodiment, a component common to that in the first embodiment is denoted with the same symbol and detailed descriptions thereon are omitted.

A point in the present embodiment different from the first embodiment is that electrodes applied with a separator-generating electric potential are independently controlled in the central portion and the end portion of a separator 120. In the present embodiment, a plurality of first unit separators BU1 include a plurality of first central unit separators BU1c and a plurality of first edge unit separators BU1e. The plurality of the first central separators BU1c are formed at a first central pitch P1c in the central portion of the separator 120 and the plurality of first edge unit separators BU1e are formed at a first edge pitch P1e in the edge portion of the separator 120. The first central pitch P1c is different from the first edge pitch P1e. In the present embodiment, the first central pitch P1c is smaller than the first edge pitch P1e.

As illustrated in FIG. 15A, 2k pieces of first wiring WR1 are provided to a first substrate 121. First k pieces of first wiring WR1 ($WR1_1$ to $WR1_k$) are electrically connected to a plurality of first central electrodes 127c arranged at a third central pitch P3c in the central portion of the separator 120. Next k pieces, from (k+1)th to 2kth pieces, of first wiring WR1 ($WR1_{k+1}$ to $WR1_{2k}$) are electrically connected to the plurality of first edge electrodes 127e arranged at a third edge pitch P3e in the edge portion of the separator 120. The third central pitch P3c is different from the third edge pitch P3e. In present embodiment, the third central pitch P3c is smaller than the third edge pitch P3e.

The plurality of first central electrodes 127c arranged in the central portion of the separator 120 are divided into multiple (k) groups by short-circuiting of every other electrodes or every other multiple electrodes of the first central electrodes 127c by one of the first k pieces of the first wiring WR1 ($WR1_1$ to $WR1_k$). For example, the plurality of the first central electrodes include a first central electrode $127c_{1A}$ and a second first central electrode $127c_{1B}$ adjacent to the first central electrode $127c_{1A}$ at the first central pitch P1c. The first central electrode $127c_{1A}$ is connected to the second first central electrode $127c_{1B}$ via the same wiring ($WR1_1$).

The plurality of first edge electrodes 127e arranged in the edge portion of the separator 120 are divided into multiple (k) groups by short-circuiting of every other electrodes or every other multiple electrodes of the first edge electrodes 127e by one of the (k+1)th to 2 kth pieces of the first wiring WR1 ($WR1_{k+1}$ to $WR1_{2k}$). For example, the plurality of the first edge electrodes include a first first edge electrode $127e_{k+1A}$ and a second first edge electrode $127e_{k+1B}$ adjacent to the first edge electrode $127e_{k+1A}$ at the first edge pitch P1e. The first first edge electrode $127e_{k+1A}$ is connected to the second first edge electrode $127e_{k+1B}$ via the same wiring ($WR1_{k+1}$).

An edge portion of the first wiring WR1 is provided with first terminals TE1 ($TE1_1$ to $TE1_{2k}$). The number of first terminals TE1 is 2 k, which is the same as the number of pieces of the first wiring WR1. In other words, each of the number of the first electrodes 127 which form the first central unit separator BU1c and the number of the first electrodes 127 which forms the first edge unit separator BU1e is k.

The third central pitch P3c includes a width Wc1 of the first central electrode $127c_{1A}$ and a width Wc2 between the first central electrode $127c_{1A}$ and the second first central electrode $127c_{1B}$. The third edge pitch P3e includes a width We1 of the first edge electrode $127e_{1A}$ and a width We2 between the first edge electrode $127e_{1A}$ and the second first edge electrode $127e_{1B}$. In present embodiment, that the third central pitch P3c is different from the third edge pitch P3e indicates at least one of that the width Wc1 is different from the width We1 or that the width Wc2 is different from the width We2.

The second electrodes is arranged at the forth pitch P4 and the second unit separator BU2 is arranged at the second pitch P2 (as FIG. 5). In this embodiment, the second pitch P2 is bigger than the first central pitch P1c, and the second pitch P2 is bigger than the first edge pitch P1e.

As illustrated in FIG. 17, the amount of shift PSR of observation position when the visual distance D changes is different in the central portion and the end portion of an image. Therefore, a desirable amount of change in a pitch of the unit separators BU when the visual distance D changes is different in the central portion and the end portion of the separator 120.

For example, as illustrated in FIG. 17, the amount of shift PSR of observation position when the visual distance D changes is larger in the edge portion of the image than in the central portion of the image. Therefore, a desirable amount of change in the pitch of the unit separators BU when the visual distance D changes is larger in the edge portion of the separator 120 than in the central portion of the separator 120. Therefore, there are cases where it is preferable to form the edge unit separators BUe at the edge pitch Pe (large pitch) in the edge portion of the separator 120 even when the central unit separators BUc are formed at the central Pc (small pitch) in the central portion of the separator 120. Especially when the visual distance D is small, a difference in the amount of shift PSR of observation position between the central portion and the edge portion becomes large and thus it is highly desirable to differentiate a pitch of the central unit separators BUc in the central portion of the separator 120 from a pitch of the edge unit separator BUe in the edge portion of the separator 120.

In the present embodiment, therefore, the second unit separators BU2 are formed at the second pitch P2 by the second electrodes 128 in both of the central portion and the end portion of the separator 120 when the observer U observes the image from a position equivalent to the second reference position or a position farther from the image than from the second reference position. The separator controller 220 selects one or more second terminals TE2 from each of the k terminals, from the first to kth terminals, of the second terminals TE2 ($TE2_1$ to $TE2_k$) illustrated in FIG. 5 and applies the separator-generating electric potential to the selected plurality of first terminals TE2. The separator controller 220 applies the common potential to the second terminal TE2 that is not selected and the 2k first terminals TE1 illustrated in FIG. 15A.

When the observer U observes the image from a position closer to the image than from the second reference position, the first central unit separators BU1c in the central portion of the separator 120 are formed at the first central pitch P1c while the first edge unit separators BU1e in the edge portion of the separator 120 are formed at the first edge pitch P1e which is larger than the first central pitch P1c. The separator controller 220 selects one or more first terminal TE1 from each of the k terminals, from the first to kth terminals of the first terminals TE1 ($TE1_1$ to $TE1_k$) and the other k terminals, from the (k+1)th to 2 kth terminals, of first terminals TE1 ($TE1_{k+1}$ to $TE1_{2k}$) illustrated in FIG. 15A and applies the separator-generating electric potential to the selected plurality of first terminals TE1. The separator controller 220 applies the common potential to the first terminals TE1 that is not selected and the k second terminals TE2 illustrated in FIG. 5.

The separator controller 220 controls switching between the separator-generating electric potential and the common potential by the separator control signal. The separator controller 220 controls the width in the Y direction of each light-shielding units ST of unit separators BU by the number of first terminals TE1 or second terminals TE2 applied with the separator-generating electric potential. For example, the width in the Y direction of a light-shielding unit ST of the unit separator BU when the observer U observes the image from a position closer to the image than from the second reference position is smaller than the width in the Y direction of a light-shielding unit ST of the unit separator BU when the observer U observes the image from a position farther from the image than from the second reference position.

FIG. 15B is a plan view illustrating another configuration of a first substrate 121 according to a third embodiment. As illustrated in FIG. 15B, a plurality of the first central electrodes 127c and a plurality of the first edge electrodes 127e are arranged at the same pitch (the third pitch P3). As illustrated in FIG. 15B, k+1 pieces of first wiring WR1 are provided to the first substrate 121. First k pieces of first wiring WR1 ($WR1_1$ to $WR1_k$) are electrically connected to a plurality of first central electrodes 127c arranged in the central portion of the separator 120. Next 1 pieces, from (k+1)th to (k+1) pieces, of first wiring WR1 ($WR1_{k+1}$ to $WR1_{k+1}$) are electrically connected to the plurality of first edge electrodes 127e arranged in the edge portion of the separator 120. The plurality of first central electrodes 127c arranged in the central portion of the separator 120 are divided into multiple (k) groups by short-circuiting of every other electrodes or every other multiple electrodes of the first central electrodes 127c by one of the first k pieces of the first wiring WR1 ($WR1_1$ to $WR1_k$). The plurality of first edge electrodes 127e arranged in the edge portion of the separator 120 are divided into multiple (l) groups by short-circuiting of every other electrodes or every other multiple electrodes of the first edge electrodes 127e by one of the (k+1)th to (k+1)th pieces of the first wiring WR1 ($WR1_{k+1}$ to $WR1_{k+1}$). An edge portion of the first wiring WR1 is provided with first terminals TE1 ($TE1_1$ to $TE1_{k+1}$). The number of first terminals TE1 is (k+1), which is the same as the number of pieces of the first wiring WR1. In other words, the first central unit separator BU1c includes k pieces of the first electrodes 127 and the first edge unit separator BU1e includes 1 pieces of the first electrodes 127. The number of 1 is different from the number of k. In present embodiment, the number of 1 is bigger than the number of k.

In the present embodiment, the second unit separators BU2 are formed at the second pitch P2 by the second electrodes 128 in both of the central portion and the end portion of the separator 120; however, a configuration of the second unit separators BU2 is not limited thereto. The second electrodes 128 may arranged like the first electrodes 127 in the FIG. 15A of FIG. 15B. In other words, A pitch of the second central unit separator BU2c in central portion of the separator 120 may be different from a pitch of the second edge unit separator BU2e.

For example, as illustrated in FIG. 16, a plurality of second central electrodes 128c are arranged at a forth central pitch P4c and a plurality of the second edge electrodes 127e are arranged at the forth edge pitch P4e. The forth central pitch P4c is different from the forth edge pitch P4e. In present embodiment, the forth central pitch P4c is smaller than the forth edge pitch P4e.

As illustrated in FIG. 16, m+n pieces of second wiring WR2 are provided to the second substrate 122. First m pieces of second wiring WR2 ($WR2_1$ to $WR2_m$) are electrically connected to a plurality of second central electrodes 128c arranged in the central portion of the separator 120. Next n pieces, from (m+1)th to (m+n) pieces, of second wiring WR2 ($WR2_{m+1}$ to $WR2_{m+n}$) are electrically connected to the plurality of second edge electrodes 128e arranged in the edge portion of the separator 120.

An edge portion of the second wiring WR2 is provided with second terminals TE2 ($TE2_1$ to $TE2_{m+n}$). The separator controller 220 selects one or more second terminal TE2 from each of the m terminals, from the first to mth terminals of the second terminals TE2 ($TE2_1$ to $TE2_m$) and the other n terminals, from the (m+1)th to (m+n)th terminals, of second terminals TE2 ($TE2_{m+1}$ to $TE2_{m+n}$) illustrated in FIG. 16 and applies the separator-generating electric potential to the selected plurality of second terminals TE2. The separator controller 220 applies the common potential to the second terminals TE2 that is not selected and the 2k first terminals TE1 illustrated in FIG. 15A. In other words, the second central unit separator BU2c includes m pieces of the first electrodes 128 and the second edge unit separator BU2e includes n pieces of the second electrodes 128. The number of m is different from the number of n. In present embodiment, the number of n is bigger than the number of m.

As described above, in the present embodiment, the pitches of the unit separators BU in the central portion and the end portion of the separator 120 are independently controlled based on the visual distance D of the observer U and thus occurrence of crosstalk is suppressed in both of the central portion and the end portion of the image.

Fourth Embodiment

Figure 18:
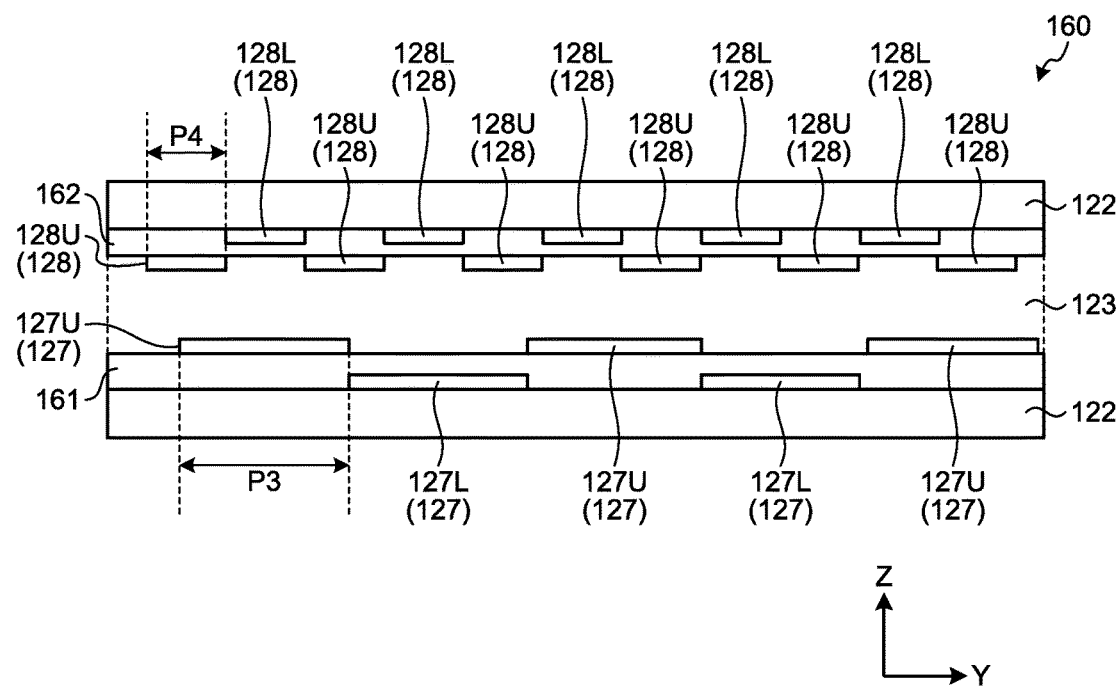
FIG. 18 is a cross-sectional view illustrating a configuration of a separator according to a fourth embodiment.
Figure 19:
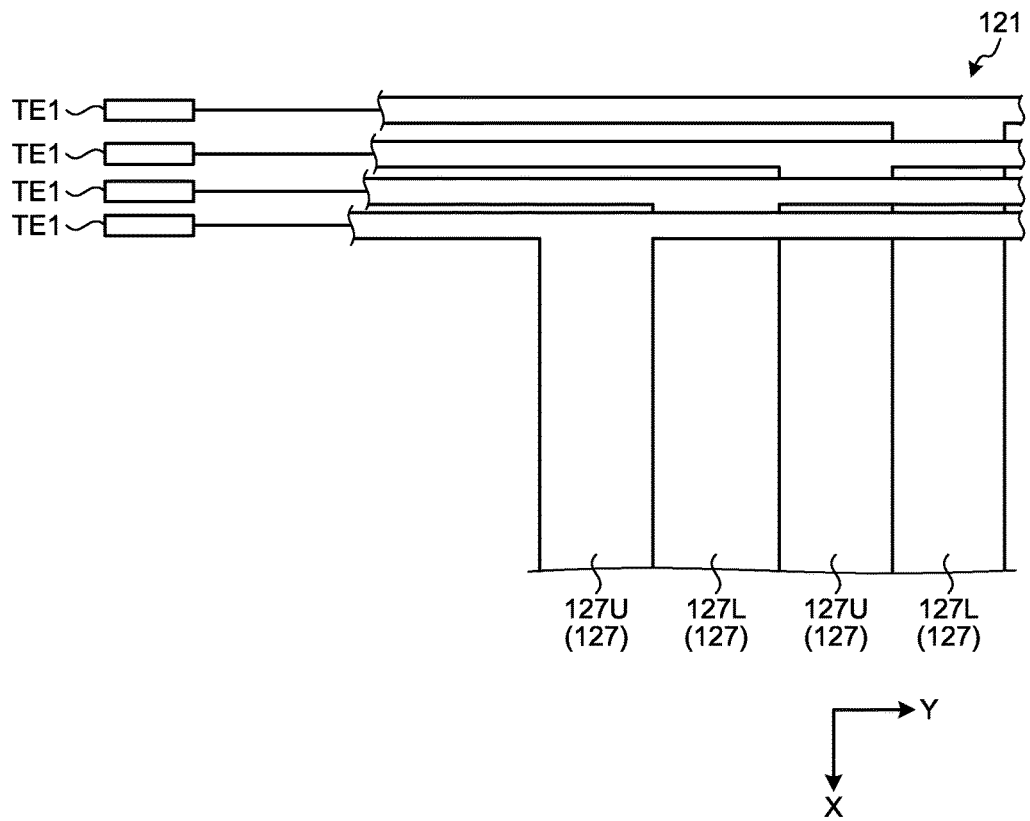
FIG. 19 is a plan view illustrating a configuration of a first substrate of the separator.

FIG. 18 is a cross-sectional view illustrating a configuration of a separator 160 according to a fourth embodiment. FIG. 19 is a plan view illustrating a configuration of a first substrate 121 of the separator 160. In the present embodiment, a component common to that in the first embodiment is denoted with the same symbol and detailed descriptions thereon are omitted.

A point in the present embodiment different from the first embodiment is that adjacent first electrodes 127 are arranged in different layers and that adjacent second electrodes 128 are arranged in different layers.

For example, as illustrated in FIG. 18, the plurality of first electrodes 127 arranged at a third pitch P3 include a plurality of first lower electrodes 127L formed on the first substrate 121 and a plurality of first upper electrodes 127U formed on an first insulating layer 161 covering the plurality of first lower electrodes 127L. Adjacent edge portions of the first electrodes 127 (edge portion of the upper electrodes 127U and an edge portion of the lower electrodes 127L) are arranged at positions not in contact with each other due to the first insulating layer 161 therebetween.

The first lower electrodes 127L and the first upper electrodes 127U are alternately arranged in the Y direction. For example, the width of each of the first upper electrodes 127U and the first lower electrodes 127L is the same as that of the third pitch P3; however, the width may be larger than the third pitch P3. Edge portions of the first lower electrodes 127L and the first upper electrodes 127U opposite to each other are arranged at positions overlapping with each other when seen from the Z direction (direction of the thickness of a liquid crystal layer). As illustrated in FIG. 19, therefore, the adjacent first electrodes 127 appear as if continuously arranged without a space thereamong when seen from the Z direction.

As illustrated in FIG. 18, the plurality of second electrodes 128 arranged at a fourth pitch P4 include a plurality of second lower electrodes 128L formed on a second substrate 122 and a plurality of second upper electrodes 128U formed on an second insulating layer 162 covering the plurality of second lower electrodes 128L. Adjacent edge portions of the second electrodes 128 (edge portion of the second upper electrodes 128U and an edge portion of the second lower electrodes 128L) are arranged at positions not in contact with each other due to the second insulating layer 162 therebetween.

The second lower electrodes 128L and the second upper electrodes 128U are alternately arranged in the Y direction. For example, the width of each of the second upper electrodes 128U and the second lower electrodes 128L is the same as that of the fourth pitch P4; however, the width may be larger than the fourth pitch P4. Edge portions of the second lower electrodes 128L and the second upper electrodes 128U opposite to each other are arranged at positions overlapping with each other when seen from the Z direction. Therefore, the adjacent second electrodes 128 appear as if continuously arranged without a space thereamong when seen from the Z direction.

Since the adjacent first electrodes 127 are arranged without a space thereamong, orientation of liquid crystal in the vicinity of edge portions of the first electrodes 127 is stable. For example, when the common potential is applied to all the first electrodes 127, a uniform distribution of electric field is formed similarly to the case of forming a common electrode, which is not patterned, on the entire surface of the first substrate 121. This is similar in the case of second electrodes 128.

It should be noted that in the present embodiment each of the plurality of first electrodes 127 and the plurality of second electrodes 128 is arranged in the plurality of layers in a distributed way; however, such a configuration may be employed in only one of the plurality of first electrodes 127 and the plurality of second electrodes 128.

In the present embodiment, the width of the first electrode 127 in the Y direction is larger than or equal to the third pitch P3. Adjacent edge portions of the first electrodes 127 are arranged at positions not in contact with each other due to the insulating layer 161 therebetween. The position of one of the edge portions is arranged at a position overlapping with the other edge portion when seen from a direction of the thickness of a liquid crystal layer 123. However, the width in the Y direction of the first electrode 127 may be smaller than the third pitch P3 and a space may be included between the edge portion and the other edge portion when seen from the Z direction.

In the present embodiment, the width of the second electrode 128 in the Y direction is larger than or equal to the fourth pitch P4. Adjacent edge portions of the second electrodes 128 are arranged at positions not in contact with each other due to the insulating layer 161 therebetween. The position of one of the edge portions is arranged at a position overlapping with the other edge portion when seen from a direction of the thickness of a liquid crystal layer 123. However, the width in the Y direction of the second electrode 128 may be smaller than the fourth pitch P4 and a space may be included between the edge portion and the other edge portion when seen from the Z direction.

Fifth Embodiment

Figure 20:
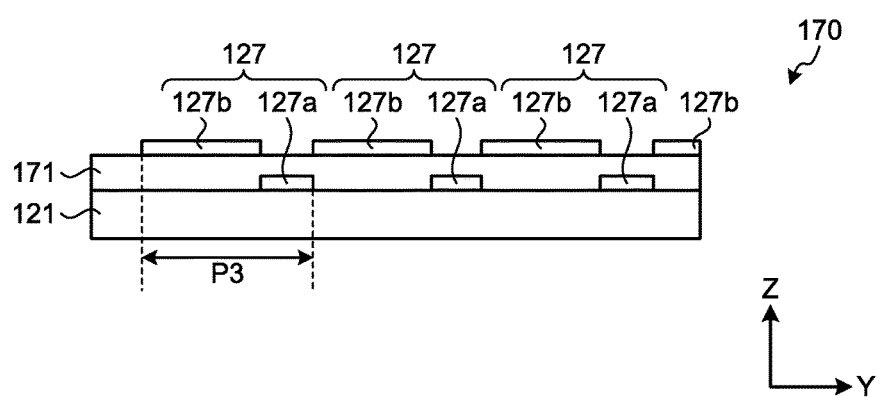
FIG. 20 is a cross-sectional view illustrating a configuration of a plurality of the first electrodes according to a fifth embodiment.
Figure 21:
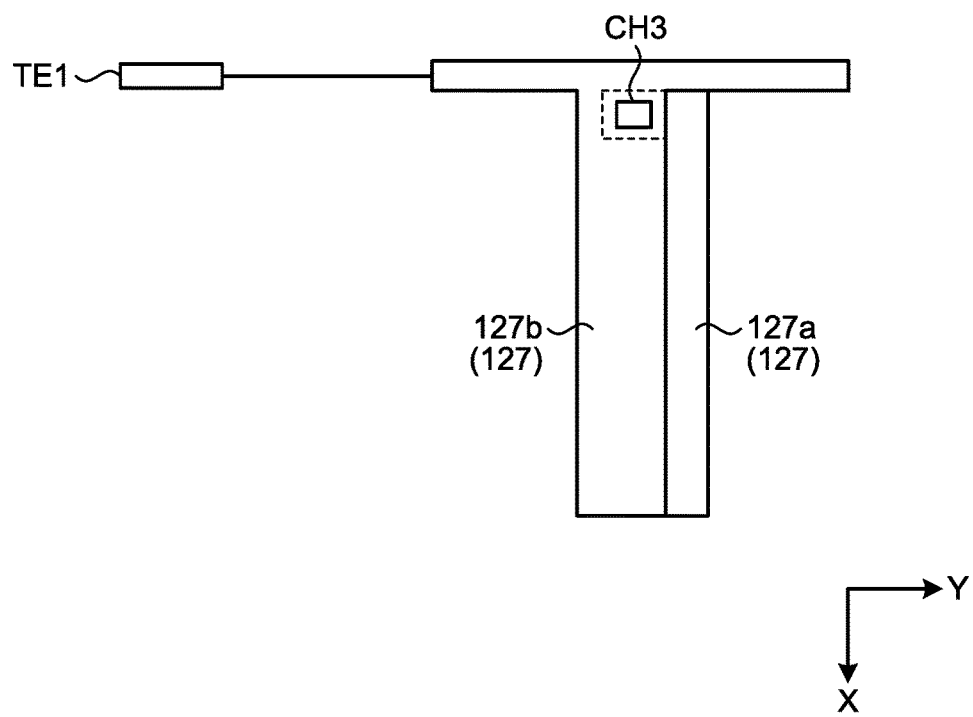
FIG. 21 is a plan view illustrating a configuration of the first substrate.

FIG. 20 is a cross-sectional view illustrating a configuration of a plurality of the first electrodes 127 according to a fifth embodiment. FIG. 21 is a plan view illustrating a configuration of the plurality of the first substrate electrodes 127. In the present embodiment, a component common to that in the first embodiment is denoted with the same symbol and detailed descriptions thereon are omitted.

A point in the present embodiment different from the first embodiment is that one first electrode 127 is formed across a plurality of layers and that one second electrode 128 is formed across a plurality of layers.

For example, as illustrated in FIG. 20, a first electrode 127 includes a first lower electrode layer 127a formed on a first substrate 121 and an first upper electrode layer 127b formed on an first insulating layer 171 covering the first lower electrode layer 127a. As illustrated in FIG. 21, the first lower electrode layer 127a and the first upper electrode layer 127b are electrically connected to via a contact hole CH3 included in the first insulating layer 171. The first lower electrode layers 127a and the first upper electrode layers 127b are alternately arranged in the Y direction. Adjacent edge portions of the first electrodes 127 (edge portion of the first lower electrode layer 127a of one of the first electrodes 127 and an edge portion of the first upper electrode layer 127b of the other first electrode 127) are arranged at positions not in contact with each other due to the insulating layer 171 therebetween.

The width of the first lower electrode 127a and the width of the first upper electrode 127b may be the same or may be different from each other. For example, the width of the first electrode 127 is the same as that of the third pitch P3; however, the width may be larger than the third pitch P3. For example, of adjacent edge portions of the first electrodes 127, one of the edge portions is arranged at a position overlapping with the other edge portion when seen from the Z direction. Therefore, the adjacent first electrodes 127 appear as if continuously arranged without a space thereamong when seen from a direction of the thickness of a liquid crystal layer 123.

Since the adjacent first electrodes 127 are arranged without a space thereamong also in the present embodiment, orientation of liquid crystal in the vicinity of edge portions of the first electrodes 127 is stable.

In the present embodiment, the width of the first electrode 127 in the Y direction is larger than or equal to the third pitch P3. Adjacent edge portions of the first electrodes 127 are arranged at positions not in contact with each other due to the first insulating layer 171 therebetween. The position of one of the edge portions is arranged at a position overlapping with the other edge portion when seen from the Z direction. However, the width in the Y direction of the first electrode 127 may be smaller than the third pitch P3 and a space may be included between the edge portion and the other edge portion when seen from the Z direction.

In the present embodiment, the first electrode 127 includes the first lower electrode layer 127a and the first upper electrode layer 127b. However, the second electrode 128 may include a second lower electrode layer and an second upper electrode layer. Both of the first electrode 127 and the second electrode 128 may include a lower electrode layer and an upper electrode layer.

Sixth Embodiment

Figure 22:
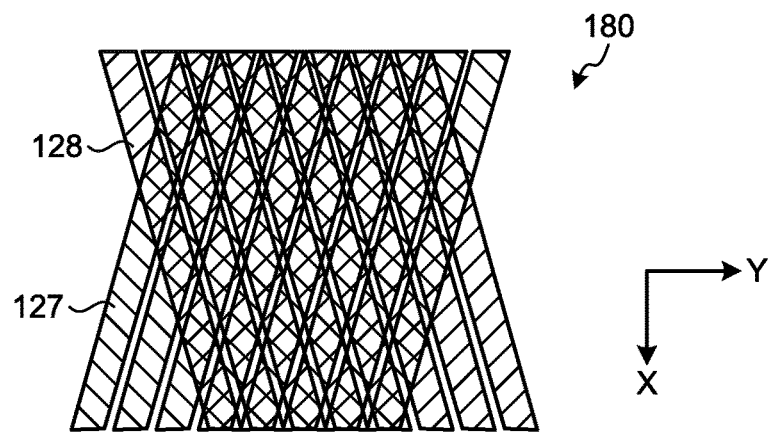
FIG. 22 is a plan view illustrating the shape of electrodes according to a sixth embodiment.
Figure 23:
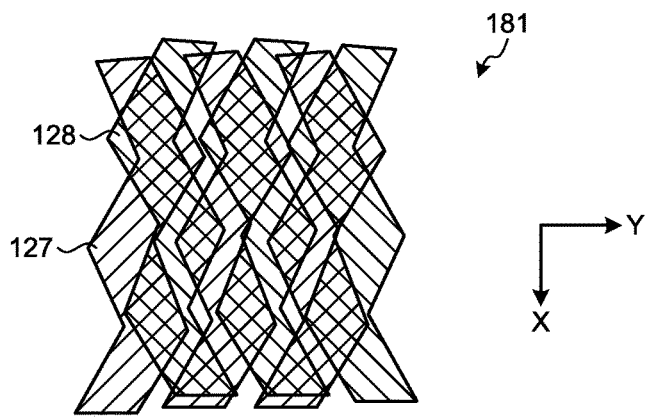
FIG. 23 is a plan view illustrating the shape of electrodes according to the sixth embodiment.

FIGS. 22 and 23 are plan views illustrating the shape of first electrodes 127 and second electrodes 128 according to a sixth embodiment. In the present embodiment, a component common to that in the first embodiment is denoted with the same symbol and detailed descriptions thereon are omitted.

A point in the present embodiment different from the first embodiment is that the first electrodes 127 includes portions obliquely crossing the second electrodes 128 provided at positions opposite to the first electrodes 127. For example, in a separator 180 illustrated in FIG. 22, the first electrodes 127 and the second electrodes 128 extend in a strip pattern such that the first electrodes 127 and the second electrodes 128 cross obliquely. In a separator 181 illustrated in FIG. 23, first electrodes 127 and second electrodes 128 extend in zigzags while bended in opposite directions to each other. In such a configuration, moire is suppressed that is generated by periodicity of pixels in the display unit 110 and periodicity of the unit separators BU in the separator 120.

Seventh Embodiment

Figure 24:
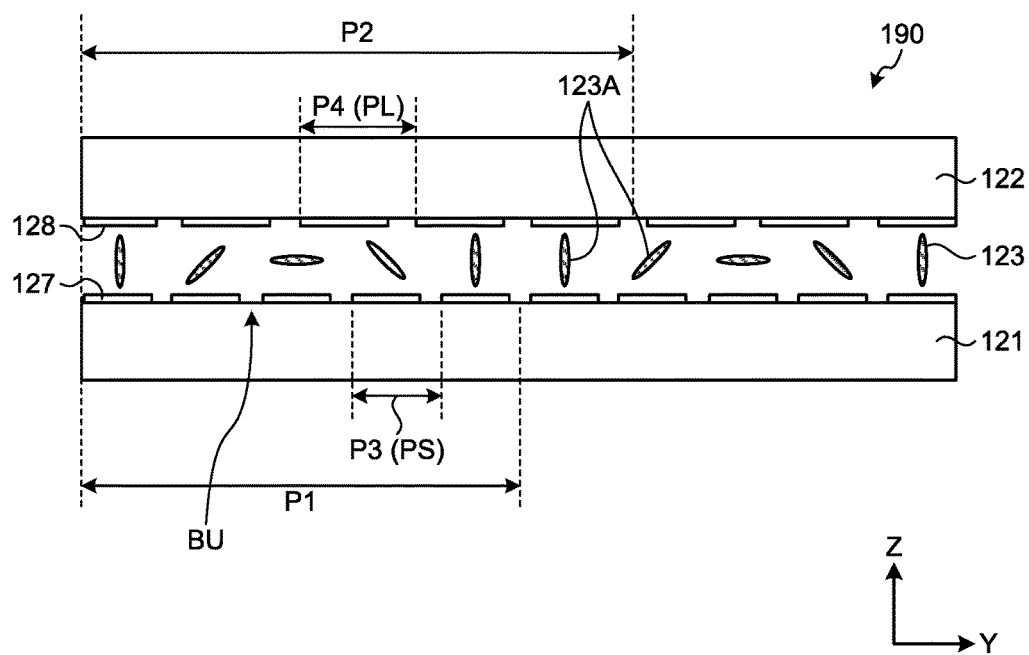
FIG. 24 is a cross-sectional view illustrating a configuration of a separator according to a seventh embodiment.

FIG. 24 is a cross-sectional view illustrating a configuration of a separator 190 according to a seventh embodiment. In the present embodiment, a component common to that in the first embodiment is denoted with the same symbol and detailed descriptions thereon are omitted.

In the present embodiment, the separator 190 functions as a lenticular lens (liquid crystal lens). An image separator B includes a plurality of unit separators BU that function as a convex lens (plano-convex lens or Fresnel lens). One unit separator BU includes a plurality of first electrodes 127 or a plurality of second electrodes 128. In FIG. 24, for example, an area where a liquid crystal layer 123 is driven by five first electrodes 127 form one unit separator BU.

Distribution of refractive indices of the unit separators BU is controlled by distribution of orientation in the liquid crystal layer 123 (distribution of electric field in the liquid crystal layer 123). In the separator 190, a voltage applied to the liquid crystal layer 123 is controlled by a separator control signal, thereby implementing a distribution of refractive indices of a convex lens shape across the plurality of first electrodes 127 and the plurality of second electrodes 128. The separator controller 220 changes, for example, the magnitude of the separator-generating electric potential supplied to the plurality of first electrodes 127 or the plurality of second electrodes 128 such that an amount of change in orientation in liquid crystal 123A gradually increases from the central portion to both end portions of the unit separators BU.

The size of the reference pitch P0, the first pitch P1, and the second pitch P2 is calculated by the aforementioned mathematical formulas (2) to (7). Since the configuration of the unit separators BU in the present embodiment and the configuration of the unit separators BU in the first embodiment are different, a method of calculating some of the parameters included in mathematical formulas (2) to (7) is different from that having been described in the first embodiment.

For example, parameters K0, K1, and K2 represent a distance from the center of a separator 120 to an end portion of a separator 120. In the first embodiment, the end portion of the separator 120 refers to, for example, the central position of the transmitting unit PT at the outermost end in the Y direction. In the present embodiment, the center of one convex lens (unit separator BU) corresponds to the center of one transmitting unit PT of the first embodiment. Therefore, the end portion of the separator 120 corresponds to the central position of the unit separator BU positioned at an outermost end in the Y direction.

Parameter N represents the number of viewpoint images controlled by the image separator B. In the first embodiment, the number of viewpoint images refers to the number of units in the entire display unit when, for example, the image area 116 visually recognized after transmission by one transmitting unit PT is regarded as one unit. In the present embodiment, the center of one convex lens (unit separator BU) corresponds to the center of one transmitting unit PT of the first embodiment. Therefore, the number of viewpoint images corresponds to the number of units in the entire display unit when the image area 116 visually recognized after transmission by one unit separator BU is regarded as one unit.

Also in the present embodiment, the plurality of patterned electrodes (first electrodes 127 and second electrodes 128) are formed on both of the first substrate 121 and the second substrate 122. Therefore, differentiating a pitch of the first electrodes 127 from that of the second electrodes 128 that are concurrently driven allows for forming two types of unit separators BU having different pitches. The function of the separator 190 is different from that of the first embodiment, however, the same effects as those of the first embodiment can be obtained.

The preferable embodiments of the present invention have been described above; however, the present invention is not limited to such embodiments. The contents disclosed in the embodiments are merely examples and thus various modifications can be included within a scope not departing from the principles of the present invention. Appropriate modifications made within the scope not departing from the principles of the present invention naturally belong to the technical scope of the present invention. All aspects of the invention that may be implemented with appropriate modifications of the design based on the aforementioned aspects of the invention also belong to the technical scope of the present invention as far as the principles of the present invention are included.

For example, in the above embodiments, every other electrodes or every other multiple electrodes of the plurality of first electrodes 127 are short-circuited to each other in order to facilitate driving of the separator 120. However, the plurality of first electrodes 127 may be electrically insulated from each other and be separately applied with a separator-generating electric potential or a common potential. This is similar in the case of second electrodes 128 and the second electrodes 151.

In the above embodiment, a pitch of the first electrodes 127 is constant. Therefore, for example, in FIG. 4, when an area where the k first electrodes 127 adjacent to each other are arranged is regarded as a first electrode area, the widths of the plurality of first electrode areas aligned in the Y direction are all equivalent. The first pitch P1 of the unit separators BU corresponds to the width of the first electrode area. However, the widths of the plurality of first electrode areas are not necessarily all equivalent. For example, the plurality of first electrode areas may include first electrode areas of a plurality of types having different widths. In this case, an average value of the widths of the first electrode areas of the plurality of types equals the first pitch P1. The width of the first electrode area is adjusted by, for example, partially differentiating a distance between the first electrodes 127 adjacent to each other in the Y direction or the width in the Y direction of each of the first electrodes 127. This configuration allows for minutely controlling the first pitch P1.

Figure 25:
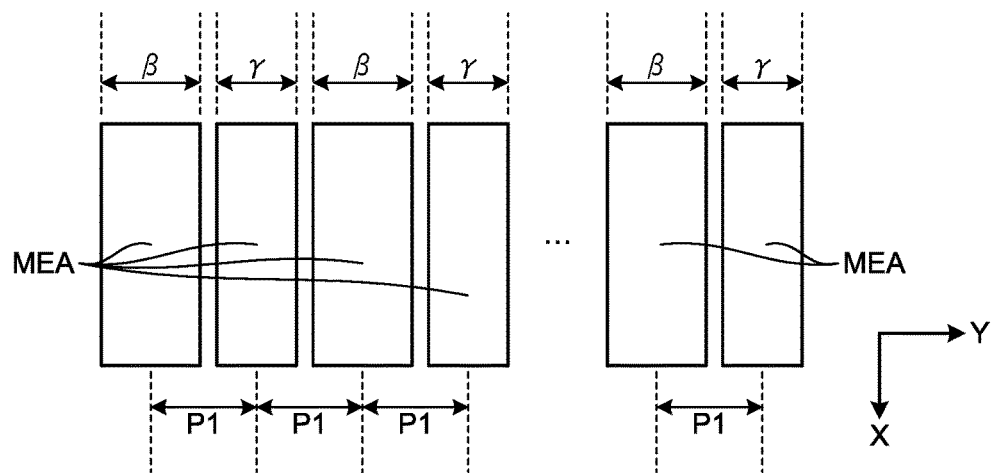
FIG. 25 is a plan view illustrating another exemplary configuration of unit separators.

For example, in FIG. 25, a plurality of first electrode areas MEAs include a plurality of first electrode areas MEA having a first width $\beta$ and a plurality of first electrode areas MEA having a second width $\gamma$ that is different from the first width $\beta$. The electrode areas MEA of the two types are alternately arranged. Therefore, an average value $(\beta+\gamma)/2$ of the first width $\beta$ and the second width $\gamma$ is equivalent to the first pitch P1. In FIG. 25, the number of types of the first electrode areas MEA is two; however, the number of types of the first electrode areas MEA is not limited to two. For example, the plurality of first electrode areas MEA may include first electrode areas of three or more types having different widths. In this case, an average value of the widths of the respective electrode areas MEA equals the first pitch P1.

The second pitch P2 of the unit separators BU can be similarly controlled. For example, in FIG. 5, when an area where the m second electrodes 128 adjacent to each other are arranged is regarded as a second electrode area, the plurality of second electrode areas may include second electrode areas of a plurality of types having different widths. In this case, an average value of the widths of the second electrode areas of the plurality of types equals the second pitch P2. This configuration allows for minutely controlling the second pitch P2.

In the above embodiments a transmissive liquid crystal display unit is used as the display unit 110; however, a configuration of the display unit 110 is not limited thereto. For example, other display units such as a reflective liquid crystal display unit or an organic EL panel may be used as the display unit 110. When a light-emitting type display unit such as an organic EL panel or a reflective liquid crystal display unit is used as the display unit 110, the illuminator 130 may not be included.

The example of detector 300 that includes the imager 310 and the image analyser 320 has been described in the above embodiments; however, a configuration of the detector 300 is not limited thereto. For example, the detector 300 may emit infrared rays or ultrasonic waves to the observer U, convert time required for receiving reflection waves into a distance, and thereby detect positional information of the observer U. The detector 300 may use the global positioning system (GPS) and thereby detect information (positional information) related to a relative position of the observer U to the display unit 110.

Alternatively, the detector 300 may detect positional information by a command input by the observer U. For example, two types of commands may be prepared. When a first command is input by the observer U, the first electrodes 127 may be used for forming the first unit separators BU1 while the second electrodes 128 may be used for forming the second unit separators BU2 when a second command is input by the observer U.

In the above embodiments, the positional information acquisitor 240 is exemplified by a connector; however, the positional information acquisitor 240 is not limited to a connector. A flexible printed circuit substrate, an input terminal, or other items may be used as a positional information acquisitor.

In FIG. 6, the second wiring WR2 provided on the second substrate 122 is electrically connected to the second terminal TE2 provided on the first substrate 121 via the conductive particle CB mixed in the seal material 129. However, the second terminal TE2 may be provided to the second substrate 122 and a FPC may be connected to both of the first substrate 121 and the second substrate 122.

The separator 120 is arranged on the front surface side of the display unit 110 in the above embodiments; however, a position of the separator 120 is not limited thereto. For example, the separator 120 may be arranged on the back surface side of the display unit 110. For example, the separator 120 may be arranged between the display unit 110 and the illuminator 130.

Variations of the electrodes illustrated in FIGS. 22 and 23 are merely examples and thus electrodes of another shape may be used.

What is claimed is:

1. A display device, comprising:
a display unit that displays an image including a plurality of viewpoint images; and
a separator that comprises
a plurality of first electrodes that form, at a first pitch, a plurality of first unit separators that separate the plurality of viewpoint images,
a plurality of second electrodes that form a plurality of second unit separators at a second pitch which is different from the first pitch, and
a liquid crystal layer, wherein
the plurality of first electrodes and the plurality of second electrodes are opposed to each other with the liquid crystal layer interposed therebetween,
the plurality of first electrodes are present in a first direction at a third pitch that is smaller than the first pitch,
the plurality of second electrodes are present in the first direction at a fourth pitch which is different from the third pitch, and
two or more first electrodes, which are included in the plurality of first electrodes and are present at the first pitch, are short-circuited.

2. The display device according to claim 1,
wherein, of the third pitch and the fourth pitch, the larger pitch is a non-integral multiple of the smaller pitch.

3. The display device according to claim 1, wherein
the fourth pitch is smaller than the second pitch, and
two or more second electrodes, which are included in the plurality of second electrodes and are present at the second pitch, are short-circuited.

4. A display device, comprising:
a display unit that displays an image including a plurality of viewpoint images; and
a separator that comprises
a plurality of first electrodes that form, at a first pitch, a plurality of first unit separators that separate the plurality of viewpoint images,
a plurality of second electrodes that form a plurality of second unit separators at a second pitch which is different from the first pitch, and
a liquid crystal layer,
wherein
the plurality of first electrodes and the plurality of second electrodes are opposed to each other with the liquid crystal layer interposed therebetween,
the plurality of first electrodes are present in a first direction at a third pitch,
the plurality of second electrodes are present in the first direction at the third pitch,
the third pitch is smaller than the first pitch,
the third pitch is smaller than the second pitch,
two or more first electrodes, which are included in the plurality of first electrodes and are present at the first pitch, are short-circuited, and
two or more second electrodes, which are included in the plurality of second electrodes and are present at a second pitch, are short-circuited.

5. The display device according to claim 1,
further comprising a first insulating layer,
wherein the plurality of first electrodes include a plurality of first upper electrodes and a plurality of first lower electrodes, and
the first insulating layer is present between the plurality of first upper electrodes and the plurality of first lower electrodes.

6. The display device according to claim 5,
further comprising a second insulating layer,
wherein the plurality of second electrodes include a plurality of second upper electrodes and a plurality of second lower electrodes, and
the second insulating layer is present between the plurality of second upper electrodes and the plurality of second lower electrodes.

7. The display device according to claim 1,
wherein the plurality of first electrodes include a part obliquely crossing at least one of the plurality of second electrodes provided at a position opposite to the at least one of the plurality of first electrodes.

8. A display device, comprising:
a display unit that displays an image including a plurality of viewpoint images; and
a separator that comprises
a plurality of first electrodes that form, at a first pitch, a plurality of first unit separators that separate the plurality of viewpoint images,
a plurality of second electrodes that form a plurality of second unit separators at a second pitch which is different from the first pitch, and
a liquid crystal layer, wherein
the plurality of first electrodes and the plurality of second electrodes are opposed to each other with the liquid crystal layer interposed therebetween,
the first unit separator is formed when the observer observes the image from a position closer to a reference position, and
the second unit separator is formed when the observer observes the image from a position farther from the reference position.

9. A display device, comprising:
a display unit that displays an image including a plurality of viewpoint images; and
a separator that comprises
a plurality of first electrodes that form, at a first pitch, a plurality of first unit separators that separate the plurality of viewpoint images,
a plurality of second electrodes that form a plurality of second unit separators at a second pitch which is different from the first pitch, and
a liquid crystal layer, wherein
the plurality of first electrodes and the plurality of second electrodes are opposed to each other with the liquid crystal layer interposed therebetween, and
positions where the plurality of first unit separators is formed move in a direction parallel to the first direction when the observer moves in a direction parallel to the first direction.

10. A display device, comprising:
a display unit that displays an image including a plurality of viewpoint images; and
a separator that comprises
a plurality of first electrodes that form, at a first pitch, a plurality of first unit separators that separate the plurality of viewpoint images,
a plurality of second electrodes that form a plurality of second unit separators at a second pitch which is different from the first pitch, and
a liquid crystal layer, wherein
the plurality of first electrodes and the plurality of second electrodes are opposed to each other with the liquid crystal layer interposed therebetween,
the first pitch includes a first central pitch and a first edge pitch which is different from the first central pitch,
a plurality of first central unit separator of the plurality of first unit separators are formed at the first central pitch in a central portion of the separator unit, and
a plurality of first edge unit separator of the plurality of first unit separators are formed at the first edge pitch in an end portion of the separator unit.

11. The display device according to claim 1, further comprising:
a first substrate,
a second substrate opposed to the first substrate,
a third substrate opposed to the second substrate,
a plurality of pixels on the third substrate,
the first electrodes on the first substrate, and
the second electrodes on the second substrate.

12. The display device according to claim 1, further comprising:
a first substrate,
a second substrate,
the first electrodes on the first substrate, and
the second electrodes on the second substrate.

* * * * *